United States Patent
Kameda

(10) Patent No.: US 7,428,123 B2
(45) Date of Patent: Sep. 23, 2008

(54) PERPENDICULAR MAGNETIC HEAD WITH YOKE OVERLAPPING INNER SIDE PORTION AND INCREASING IN WIDTH AND THICKNESS ALONG HEIGHT

(75) Inventor: Hiroshi Kameda, Tokyo (JP)

(73) Assignee: TDK Corporation, Tokyo (JP)

( * ) Notice: Subject to any disclaimer, the term of this patent is extended or adjusted under 35 U.S.C. 154(b) by 268 days.

(21) Appl. No.: 11/127,904

(22) Filed: May 12, 2005

(65) Prior Publication Data

US 2005/0259357 A1    Nov. 24, 2005

(30) Foreign Application Priority Data

May 20, 2004 (JP) .............................. 2004-149842
Dec. 27, 2004 (JP) .............................. 2004-377393

(51) Int. Cl.
    *G11B 5/31* (2006.01)
(52) U.S. Cl. ............................ 360/125.12; 360/125.14; 360/125.15; 360/125.21
(58) Field of Classification Search ................ 360/126, 360/125, 122, 317, 125.01, 125.12, 125.14, 360/125.15, 125.21
    See application file for complete search history.

(56) References Cited

U.S. PATENT DOCUMENTS

| | | | |
|---|---|---|---|
| 6,198,597 B1 * | 3/2001 | Tateyama et al. | 360/126 |
| 6,490,127 B1 * | 12/2002 | Sasaki | 360/126 |
| 6,504,675 B1 * | 1/2003 | Shukh et al. | 360/125 |
| 6,687,084 B2 | 2/2004 | Takahashi et al. | |
| 2002/0024765 A1 * | 2/2002 | Kutsuzawa et al. | 360/126 |
| 2002/0044379 A1 * | 4/2002 | Kobayashi et al. | 360/126 |
| 2002/0191349 A1 * | 12/2002 | Hsu et al. | 360/317 |
| 2005/0219744 A1 * | 10/2005 | Feldbaum et al. | 360/126 |
| 2006/0171073 A1 * | 8/2006 | Kobayashi | 360/126 |

FOREIGN PATENT DOCUMENTS

| | | |
|---|---|---|
| JP | 11-250416 | 9/1999 |
| JP | 2002-197615 | 7/2002 |
| JP | 2002-208114 | 7/2002 |
| JP | 2003-272111 | 9/2003 |
| JP | 2004-295987 | 10/2004 |

OTHER PUBLICATIONS

Notification of Reasons for Refusal for corresponding Japanese Patent Application Serial No. 2004-377393, dated Dec. 19, 2006.
Notice of Preliminary Rejection for corresponding Japanese Patent Application Serial No. 2004-377393, dated Oct. 16, 2007.

* cited by examiner

*Primary Examiner*—Craig A Renner
(74) *Attorney, Agent, or Firm*—Brinks Hofer Gilson & Lione

(57) ABSTRACT

A perpendicular magnetic recording head includes a first magnetic portion, a second magnetic portion formed with a gap from the first magnetic portion, and a coil layer located in the gap between the first magnetic portion and the second magnetic portion for applying a recording magnetic field to the first magnetic field and the second magnetic field. The yoke layer is formed on the second magnetic portion, a width whose direction is orthogonal to the height direction of a front end of the yoke layer becomes larger gradually or continuously as going in the height direction, and the width becomes larger gradually or continuously as going farther from the second magnetic portion.

5 Claims, 26 Drawing Sheets

PERPENDICULAR MAGNETIC HEAD WITH YOKE OVERLAPPING INNER SIDE PORTION AND INCREASING IN WIDTH AND THICKNESS ALONG HEIGHT

BACKGROUND OF THE INVENTION

This application claims the benefit of priority to Japanese Patent Application Nos. 2004-149842 filed on May 20, 2004 and 2004-377393 filed on Dec. 27, 2004, both herein incorporated by reference.

1. Field of the Invention

The present invention relates to a perpendicular magnetic recording head which performs recording by applying a vertical magnetic field to a recording medium, such as a disk having a hard surface, and more particularly, to a perpendicular magnetic recording head capable of suppressing the generation of fringing on a recording pattern and improving recording efficiency.

2. Description of the Related Art

A perpendicular magnetic recording head has been used for a vertical magnetic recording system to record magnetic data on a recording medium, such as a disk, with high density. In general, this perpendicular magnetic recording head has the structure that it has an auxiliary magnetic pole layer made of ferromagnetic materials, and a main magnetic pole layer which is made of ferromagnetic materials and which is formed with a gap from the auxiliary magnetic pole layer.

A front end of the auxiliary magnetic pole layer and a front end of the main magnetic pole layer are shown on a medium-opposing surface of a recording medium, and they are magnetically connected to each other at the rear side of a height direction. A coil layer is formed between the auxiliary magnetic pole layer and the main magnetic pole layer. When a recording magnetic field is induced in the auxiliary magnetic pole layer and the auxiliary magnetic pole layer by supplying electricity to the coil layer, on the medium-opposing surface of the recording medium, a leakage recording magnetic field is generated between the auxiliary magnetic pole layer and the main magnetic pole layer. The leakage recording magnetic field passes through the recording medium, so that recording signals are recorded on the recording medium.

Here, the ferromagnetic material used for the main magnetic pole layer has high saturation magnetic flux density. However, since the ferromagnetic material has low permeability in general, it is difficult to induce the recording magnetic field induced in the main magnetic pole layer in the front end of the main magnetic pole layer. For this reason, there is provided a perpendicular magnetic recording medium in which a yoke layer made of materials having high permeability is adjacently formed to the main magnetic pole layer and it is intended to induce the recording magnetic field in the front end of the main magnetic pole easily.

In this way, in the perpendicular magnetic recording head where the yoke layer is formed, it is effective to make the yoke layer approach the medium-opposing surface of the recording medium in effectively inducing the recording magnetic field in the front end of the main magnetic pole. However, if the yoke layer approaches the medium-opposing surface of the recording medium too much, it becomes easy for the recording magnetic field to flow into the recording medium from a front end of the yoke layer as well. As a result, there is a problem in that a so-called side fringing occurs.

As the perpendicular magnetic recording head capable of suppressing the side fringing problem, Japanese Unexamined Patent Application Publication No. 2002-197615 (see FIGS. 1 and 10 or FIGS. 3 and 14) has proposed a perpendicular magnetic recording head, in which a front end surface 35a of a yoke layer is formed into an inclined surface or a curved surface so as to approach the medium-opposing surface of the recording medium toward a top surface from a bottom surface.

In the perpendicular magnetic recording head disclosed in Japanese Unexamined Patent Application Publication No. 2002-197615, since the yoke layer 35 made of materials having high permeability is formed in contact with the main magnetic pole layer 24, the recording magnetic field can be induced in the front end of the main magnetic pole layer 24. At the same time, since the front end surface 35a of the yoke layer 35 is formed into an inclined surface and a cross-sectional area decreases, a magnetic volume of the yoke layer 35 in the vicinity of the medium-opposing surface of the recording medium is suppressed. Therefore, the recording magnetic field can be restrained from flowing into the recording medium from the front end surface of the yoke layer 35, so that the side fringing can be suppressed.

However, in the perpendicular magnetic recording head disclosed in Japanese Unexamined Patent Application Publication No. 2002-197615, a width at an area where the front end surface 35a of the yoke layer 35 is formed increases continuously as going in the height direction, but the width is constant at locations more progressed than the front end surface 35a in the height direction. In addition, whether the width is constant from a top surface of the yoke layer 35 to a bottom surface of the yoke layer 35 is not plainly described. In addition, from FIGS. 1 and 10, in an area where a film thickness of the front end surface of the yoke layer 35 is changed (inclined), whether a width changes in accordance with the thickness is not plainly described.

Therefore, in the yoke layer 35 disclosed in Japanese Unexamined Patent Application Publication No. 2002-197615, since there is a limitation in increasing the magnetic volume as a whole, it is not possible to induce the recording magnetic field effectively in the main magnetic pole layer 24.

SUMMARY OF THE INVENTION

The present invention has been finalized in view of the drawbacks inherent in the conventional perpendicular magnetic recording head, and it is an object of the present invention to provide a perpendicular magnetic recording head capable of inducing a recording magnetic field in a front end portion of a main magnetic pole effectively, and preventing side fringing from being generated.

The invention provides a perpendicular magnetic recording head including: a first magnetic portion; a second magnetic portion formed with a gap from the first magnetic portion; and a coil layer located in the gap between the first magnetic portion and the second magnetic portion for applying a recording magnetic field to the first magnetic portion and the second magnetic portion. In addition, a yoke layer is formed in contact with the second magnetic portion, a width whose direction is orthogonal to the height direction of a front end of the yoke layer becomes larger gradually or continuously as going in the height direction, and the width becomes larger gradually or continuously as going farther from the second magnetic portion.

In this case, the yoke layer is preferable to be constructed to have an area where a thickness becomes larger gradually or continuously as going in the height direction.

Preferably, the yoke layer has higher magnetic permeability than a second magnetic layer.

In this case, it is preferable that saturation magnetic flux density of the yoke layer become larger as going closer to the second magnetic portion and it be easy for a magnetic flux to be concentrated on the second magnetic portion.

In addition, the second magnetic portion may be formed more at a leading side than the first magnetic portion or the second magnetic portion may be formed more at a trailing side than the first magnetic portion.

In the perpendicular magnetic recording head of the invention, the width of the yoke layer is constructed to become larger gradually or continuously as going in the height direction, or to become larger gradually or continuously as going farther from the main magnetic layer. That is, the width of the yoke layer becomes smaller as going toward the medium-opposing surface of the recording medium, or becomes smaller as going closer to the main magnetic pole layer. For this reason, the magnetic volume of the yoke layer can become smaller as going toward the main magnetic pole layer. Therefore, the recording magnetic field cannot easily flow to the recording medium from the yoke layer, so that the side fringing can be suppressed.

The width of the yoke layer is constructed to become larger as going in the height direction (in the Y2 direction in the drawing). The magnetic volume of the yoke layer becomes larger as going farther from the medium-opposing surface of the recording medium. Therefore, since it is possible to enlarge the magnetic volume of the yoke layer as a whole, the recording magnetic field can be easily induced in the main magnetic pole layer.

DESCRIPTION OF THE PREFERRED EMBODIMENT

Figure 1:
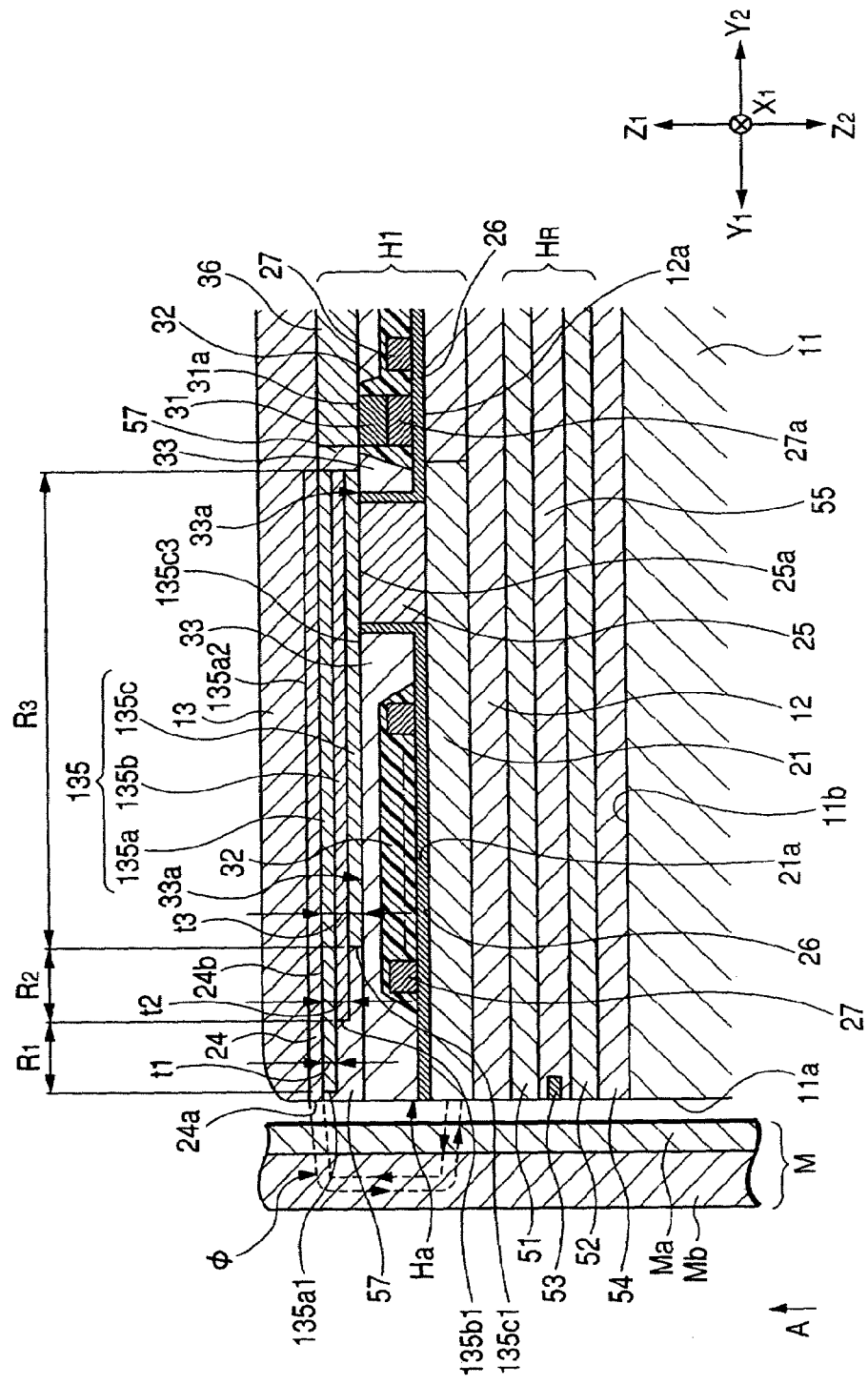
FIG. 1 is a longitudinal cross-sectional view showing the structure of a perpendicular magnetic recording head according to a first embodiment of the invention.

Preferred embodiments of the present invention will now be described with reference to the drawings. FIG. 1 is a longitudinal cross-sectional view showing the structure of a perpendicular magnetic recording head according to a first embodiment of the present invention.

A perpendicular magnetic recording head H1 shown in FIG. 1 applies a vertical magnetic field Φ to a recording medium M and magnetizes a hard layer Ma of the recording medium M in a vertical direction.

The recording medium M has, for example, a disc shape. The recording medium M has the hard surface Ma having high remnant magnetization formed thereon and a soft layer Mb having high magnetic permeability formed therein, and rotates on its center functioning as a rotation axis.

A slider 11 of the perpendicular magnetic recording head H1 is made of ceramic materials, such as $Al_2O_3$ or TiC. A surface 11a of the slider 11 faces the recording medium M. Rotation of the recording medium M creates airflow at the medium surface and the airflow allows the slider 11 to float from or slide over the surface of the recording medium M. In FIG. 1, the recording medium M moves in a direction designated by arrow A (in a Z1 direction) with respect to the slider 11. The perpendicular magnetic recording head H1 is provided on a trailing end surface of the slider 11.

A nonmagnetic insulating layer 54 made of inorganic materials, such as $Al_2O_3$ or $SiO_2$, is formed on a side end surface 11b of the slider 11, and a reading portion $H_R$ is formed on the nonmagnetic insulating layer 54.

The reading portion $H_R$ is composed of, from the bottom, a lower shield layer 52, a gap layer 55, a magneto-resistance effect element 53, and an upper shield layer 51. The magneto-resistance effect element 53 is an anisotropic magneto-resistance (AMR) element, a giant magneto-resistance (GMR) element, or a tunnel magneto-resistance (TMR) element.

A nonmagnetic insulating layer 12 made of inorganic materials, such as $Al_2O_3$ or $SiO_2$, is formed on the upper shield layer 51, and the perpendicular magnetic recording head H1 for recording is provided on the nonmagnetic insulating layer 12. In addition, the perpendicular magnetic recording head H1 is covered with a protecting layer 13 formed of inorganic nonmagnetic insulating materials, etc. An opposing surface Ha of the perpendicular magnetic recording head H1 toward the recording medium and the opposing surface 11a of the slider 11 toward the recording medium are substantially on the same plane.

In the perpendicular magnetic recording head H1, an auxiliary magnetic layer 21 functioning as a first magnetic portion is formed by plating with Ni—Fe, Fe—Ni (Fe-rich), Fe—Co—Rh, Fe—Co, and Fe—Co—Ni.

The nonmagnetic insulating layer 12 is formed beneath the auxiliary magnetic layer 21 (between the auxiliary magnetic layer 21 and a side end surface 11b of the slider 11) or around the auxiliary magnetic layer 21. As shown in FIG. 1, the surface (a top surface) 21a of the auxiliary magnetic layer 21 and the surface (a top surface) 12a of the nonmagnetic insulating layer 12 are on the same plane.

As shown in FIG. 1, a connecting layer 25 such as Ni—Fe is formed at a location farther than the opposing surface Ha in the height direction (in a Y2 direction in the drawing) on the surface 21a of the auxiliary magnetic layer 21.

In the vicinity of the connecting layer 25, a nonmagnetic insulating layer 26, such as $Al_2O_3$, is formed on the surface 21a of the auxiliary magnetic layer 21 and the surface 12a of the nonmagnetic insulating layer 12, and a coil layer 27 formed of conductive materials, such as Cu, is formed on the nonmagnetic insulating layer 26. A frame plating method forms the coil layer 27, and the coil layer 27 is spirally pattern-formed to be wound by the predetermined winding number in the vicinity of the connecting layer 25. A bottom raising layer 31 made of a conductive material, such as Cu, is formed on a connecting end 27a located at the winding center of the coil layer 27.

The coil layer 27 and the bottom raising layer 31 are coated with an insulating layer 32 made of organic materials, such as resist materials, and also are covered with an insulating layer 33.

It is preferable that the insulating layer 33 be formed of inorganic insulating materials. Here, as the inorganic insulating materials, at least one or more can be selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

In addition, the surface (the top surface) 25a of the connecting layer 25, the surface (the top surface) 31a of the bottom raising layer 31, and a surface (a top surface) 33a of the insulating layer 33 are planarized so as to be located on the same plane. The planarized surface is formed by utilizing CMP (chemical mechanical polishing) technology.

In the perpendicular magnetic recording head according to the embodiment shown in FIG. 1, a yoke layer 135 made of a material having high permeability, such as Permalloy (Ni—Fe), is formed on the insulating layer 33. The yoke layer 135 is formed with a higher permeability than a main magnetic pole layer 24, which will be described later. A base end of the yoke layer 135 is magnetically connected to the surface 25a of the connecting layer 25.

As shown in FIG. 1, the vicinities of the yoke layer 135 are buried by an insulating layer 57, the insulating layer 57 is shown from the medium-opposing surface Ha of the recording medium, and a portion that is denoted by a reference numeral 135a1 and that constitutes a front end of the yoke layer 135 is located behind the opposing surface Ha in the height direction. In the invention, a top surface of the insulating layer 57 and a top surface of the yoke layer 135 are planarized to be located on the same plane by utilizing a CMP (chemical mechanical polishing) technology.

It is preferable that the insulating layer 57 be formed of inorganic insulating materials. As the inorganic insulating materials, at least one or more can be selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

From above the planarized insulating layer 57 to a top surface of the yoke layer 135, the main magnetic pole layer 24 functioning as a second magnetic portion is formed, in which the main magnetic pole layer is formed of a material having high saturation magnetic flux density, such as Fe—Co—Rh, Fe—Co, and Fe—Co—Ni. As shown in FIG. 1, the main magnetic pole layer 24 is formed above the auxiliary magnetic pole layer 21, that is, at a trailing side (in the Z1 direction in the drawing).

As shown in FIG. 1, a lead layer 36 is formed on the surface 31a of the bottom raising layer 31, and recording current can be supplied to the bottom raising layer 31 and the coil layer 27 through the lead layer 36. The yoke layer 135 and the lead layer 36 are covered with the protecting layer 13.

Figure 2:
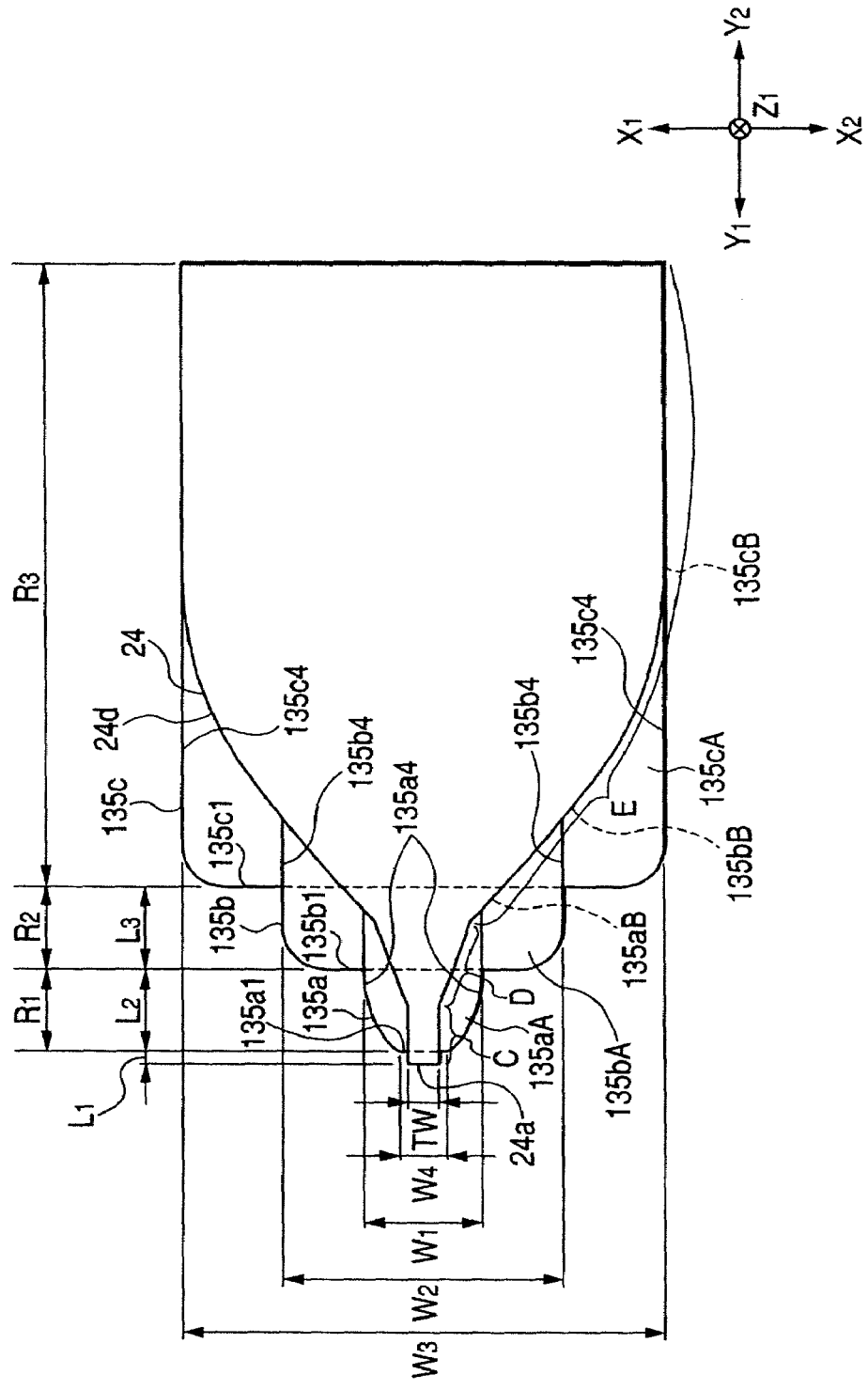
FIG. 2 is a plan view of the perpendicular magnetic recording head shown in FIG. 1 as viewed from an upper side.
Figure 3:
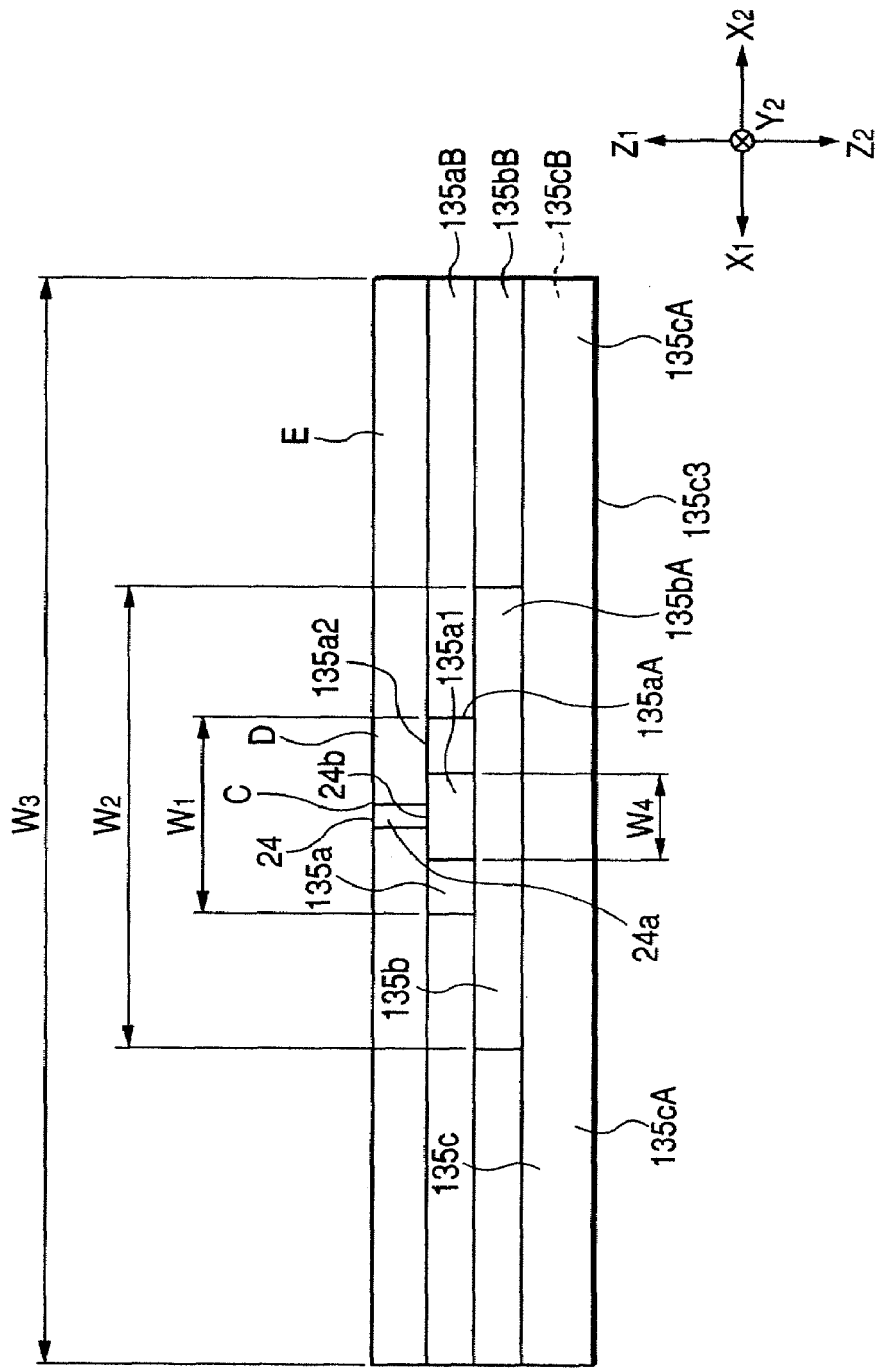
FIG. 3 is a fragmentary front view of the perpendicular magnetic recording head shown in FIG. 1 as viewed from a medium-opposing surface of a recording medium.

FIG. 2 is a plan view of the perpendicular magnetic recording head shown in FIG. 1 as viewed from an upper side (in the Z1 direction in FIG. 1). Further, FIG. 3 is a fragmentary front view showing the main magnetic pole layer 24 and the yoke layer 135 of the perpendicular magnetic recording head H1 shown in FIG. 1 as viewed from the medium-opposing surface Ha of the recording medium (in the Y1 direction in FIG. 1). As shown in FIGS. 2 and 3, the main magnetic pole layer 24 has a front end portion C having a constant width (=a track width Tw), an intermediate portion D which has a predetermined angle with respect to a side surface of the front portion C and whose width gradually becomes larger as going from the front end portion C, and a rear end portion E which has a predetermined angle with respect to the side surface of the front end portion C and is formed from the intermediate portion D.

Hereinafter, characteristic features of the present invention will be described.

As shown in FIGS. 1 to 3, in the perpendicular magnetic recording head H1, the yoke layer 135 has the laminated structure that from a top, a first layer 135a, a second layer 135b, and a third layer 135c are laminated. Therefore, in the yoke layer 135, a top surface 135a2 of the first layer 135a becomes the top surface of the yoke layer 135, and a bottom surface 135c3 of the third layer 135c becomes the bottom surface of the yoke layer 135.

In addition, a front end surface 135a1 of the first layer 135a is constructed so as to become a front end of the yoke layer 135.

As shown in FIG. 2, the first layer 135a is constructed so as to have a front portion 135aA which extends in the height direction with a predetermined maximum width W1, and a rear portion 135aB which extends in the height direction from the front portion 135aA.

The second layer 135b is constructed so as to have a front portion 135bA which extends in the height direction with a predetermined maximum width W2, and a rear portion 135bB which extends in the height direction from the front portion 135bA.

The third layer 135c is constructed so as to have a front portion 135cA which extends in the height direction with a predetermined maximum width W3, and a rear portion 135cB which extends in the height direction from the front portion 135cA.

As shown in FIG. 2, the front portion 135aA of the first layer 135a extends to a location where a side edge portion 135a4 of the first layer 135a opposes the main magnetic pole layer 24 in a film thickness direction (in the Z1-Z2 direction in the drawing) while extending in the height direction from the front end surface 135a1. The rear portion 135aB is constructed in the height direction from the position where the side edge portion 135a4 of the first layer 135a opposes the main magnetic pole layer 24 in the film thickness direction. As shown in FIG. 2, the rear portion 135aB is formed such that the planar shape viewed from the upper side is formed along a circumference 24d of the main magnetic pole layer 24.

In the same manner, the front portion 135bA of the second layer 135b extends to a location where a side edge portion 135b4 of the second layer 135b opposes the main magnetic pole layer 24 in a film thickness direction while extending in the height direction from the front end surface 135b1 of the second layer 135b. In addition, the rear portion 135bB is constructed toward the height direction from the position where the side edge portion 135b4 of the second layer 135b opposes the main magnetic pole layer 24 in the film thickness direction. As shown in FIG. 2, the rear portion 135bB is formed such that the planar shape viewed from the upper side is formed along the circumference 24d of the main magnetic pole layer 24.

In the same manner, the front portion 135cA of the third layer 135c extends to a location where a side edge portion 135c4 of the third layer 135c opposes the main magnetic pole layer 24 in a film thickness direction while extending in the height direction from the front end surface 135c1 of the third layer 135c. In addition, the rear portion 135cB is constructed in the height direction from the position where the side edge portion 135c4 of the third layer 135c opposes the main magnetic pole layer 24 in the film thickness direction. As shown in FIG. 2, the rear portion 135cB is formed such that the planar shape viewed from the upper side is formed along the circumference 24d of the main magnetic pole layer 24.

In this way, when the rear portion 135aB of the first layer 135a, the rear portion 135bB of the second layer 135b, and the rear portion 135cB of the third layer 135c have the planar shapes which are formed along the circumference 24d of the main magnetic pole layer 24, magnetic volumes of the first layer 135a, the second layer 135b, and the third layer 135c can enlarge as a whole, which makes the induction of a recording magnetic field in the main magnetic pole easier.

As shown in FIGS. 1 and 3, the top surface 135a2 of the first layer 135a is formed so as to adjacent to a bottom surface 24b of the main magnetic pole layer 24. The second layer 135b is formed in contact with the bottom of the first layer 135a. The front end surface 135b1 of the second layer 135b is formed a predetermined distance L2 away from the front end surface 135a1 of the first layer 135a. The front end surface 135c1 of the third layer 135c is formed a predetermined distance L3 away from the front end surface 135b1 of the second layer 135b. Therefore, as shown in FIGS. 1 and 2, the front end surface 135a1 of the first layer 135a is constructed as the front end surface of the yoke layer 135. Further, when the yoke layer 135 is seen in the height direction (in the Y2 direction in the drawing), the yoke layer 135 includes an area R1 where only the first layer 135a is formed, an area R2 where two layers of the first layer 135a and the second layer 135b are formed, and an area R3 where three layers of the first layer 135a, the second layer 135b, and the third layer 135c are formed. For example, the distance L2 is 0.01 to 100 μm, and the distance L3 is 0.01 to 100 μm.

As shown in FIG. 2, the front end surface 135a1 of the first layer 135a is formed at a location farther by a predetermined distance L1 than the front end surface 24a (the medium-opposing surface Ha of the recording medium) of the main magnetic pole layer 24 in the height direction (in the Y2 direction in FIG. 1). The side of the medium-opposing surface Ha of the recording medium rather than the front end surface 135a1 of the first layer 135a (in the Y1 direction in the drawing, that is, a direction opposite to the height direction) is covered with the insulating layer 57, and the front end surface 135a1 of the first layer 135a is not shown at the medium-opposing surface Ha of the recording medium. The yoke layer 135 is recessed by the distance L1 from the front end surface 24a of the main magnetic pole layer 24 (the medium-opposing surface Ha of the recording medium) to the front end surface 135a1 of the first layer 135a. For example, the distance L1 is 0 to 10 μm.

As shown in FIGS. 2 and 3, the maximum width W1 of the front portion 135aA of the first layer 135a is smaller than the maximum width W2 of the front portion 135bA of the second layer 135b. In addition, the maximum width W2 of the front portion 135bA of the second layer 135b is smaller than the maximum width W3 of the front portion 135cA of the third layer 135c. Therefore, when the yoke layer 135 is seen with respect to the front portions 135aA, 135bA, and 135cA, the widths becomes increase from W1 to W2 and W3 gradually as going in the height direction (in the Y2 direction in the drawing). For example, the relationships between the widths W1, W2, and W3 are $0.01\ \mu m \leqq W1 \leqq W2 \leqq W3 \leqq 100\ \mu m$.

As shown in FIG. 2, a width W4 in a direction (the X1-X2 direction) which is orthogonal to the height direction (the Y1-Y2 direction) of the front end surface 135a1 of the first layer 135a that is the front end of the yoke layer 135 increases to the width W1 and increases from the widths W2 to W3 as going in the height direction (in the Y2 direction).

As shown in FIG. 1, the yoke layer 135 is constructed so as to have the same thickness t1 as that of the first layer 135a in the area R1. In addition, in the area R2, the yoke layer 135 is constructed so as to have a thickness t2 which is a sum of the thickness of the first layer 135a and the thickness of the second layer 135b. In addition, in the area R3, the yoke layer 135 is constructed so as to have a thickness t3 which is a sum of the thickness of the first layer 135a, the thickness of the second layer 135b, and the thickness of the third layer 135c. That is, the yoke layer 135 is constructed such that the thickness becomes increase from t1 to t2 and t3 as going downward in the height direction (in the Y2 direction in the drawing). For example, the thickness t1, the thickness t2, and the thickness t3 become larger gradually within a range of 0.01 to 10 μm.

In addition, as shown in FIG. 3, when the yoke layer 135 is seen with respect to the front portion 135aA, 135bA, and 135cA, the width W1 of the front portion 135aA of the first layer 135a located at the highest (in the Z1 direction in the drawing) is the smallest, the width W2 of the front portion 135bA of the second layer 135b which is located at the intermediate and which is formed beneath the first layer 135a is larger than the width W1 of the front portion 135aA of the first layer 135a, and the width W3 of the front portion 135cA of the third layer 135c located at the lowest (in the Z2 direction in the drawing) is larger than the width W1 of the front portion 135aA of the first layer 135a and the width W2 of the front portion 135bA of the second layer 135b. That is, when the yoke layer 135 is seen with respect to the front portion 135aA, 135bA, and 135cA, as going from the top surface 135a2 of the first layer 135a to the bottom surface 135c3 of the third layer 135c (as going in the Z2 direction which is a downward direction), the width becomes larger from W1 to W2 and W3 gradually.

In the perpendicular magnetic recording head H1 of the present invention, the main magnetic pole layer 24 is formed of materials having high saturation magnetic flux density. However, since the material having high saturation magnetic flux density has low permeability in general, it is difficult to induce the recording magnetic field induced in the main magnetic pole layer 24 onto the front end surface 24a of the main magnetic pole layer. For this reason, the yoke layer 135 made of materials having high permeability is adjacently formed to the main magnetic pole layer 24 so as to induce the recording magnetic field onto the front end surface 24a of the main magnetic pole layer 24 easily.

Here, in order to induce the recording magnetic field onto the front end surface 24a of the main magnetic pole layer 24 effectively, it is effective to make the yoke layer 135 approach the medium-opposing surface Ha of the recording medium. However, if the yoke layer 135 approaches the opposing surface Ha too much, it is easy for the recording magnetic field to flow to the recording medium M from the yoke layer 135 as well, so that a so-called side fringing occurs.

In the perpendicular magnetic recording head H1 of the invention, all of the width W4 and the thickness of the front end surface 135a1 of the first layer 135a that is the front end of the yoke layer 135 are constructed to become larger gradually as going in the height direction (in the Y2 direction in the drawing). That is, as the yoke layer 135 goes toward the medium-opposing surface Ha of the recording medium, the width and thickness become smaller. As a result, the magnetic volume of the yoke layer 135 can become smaller gradually as going toward the medium-opposing surface Ha of the recording medium. Therefore, even though the yoke layer 135 approaches the medium-opposing surface Ha of the recording medium in order to induce the recording magnetic field in the main magnetic pole layer 24 effectively, the recording magnetic field cannot easily flow to the recording medium M from the yoke layer 135, so that the side fringing can be suppressed.

Since the width and thickness of the yoke layer 135 become larger as going in the height direction (in the Y2 direction in the drawing), the farther it goes from the medium-opposing surface Ha of recording medium, the larger the magnetic volume becomes. Therefore, since it is possible to enlarge the magnetic volume of the yoke layer 135 as a whole, the recording magnetic field can be easily induced in the main magnetic pole layer 24.

In the yoke layer 135, the width W4 becomes larger as going from the top surface 135a2 of the first layer 135a constituting the top to the bottom surface 135c3 of the third layer 135c which constitutes the bottom, that is, the width W4 becomes larger as going farther from the main magnetic pole layer 24. Therefore, since it is possible to enlarge the magnetic volume of the yoke layer 135 as a whole, the recording magnetic field can be effectively induced in the main magnetic pole layer 24 easily.

As described above, in the perpendicular magnetic recording head H1 of the invention, even though the yoke layer 135 approaches the medium-opposing surface Ha of the recording medium in order to induce the recording magnetic field in the main magnetic pole layer 24 effectively, the magnetic volume of the yoke layer 135 can become smaller as going toward the medium-opposing surface Ha of the recording medium. Therefore, the side fringing can be suppressed. Further, since it is possible to enlarge the magnetic volume of the yoke layer 135 as a whole, the recording magnetic field can be effectively induced in the main magnetic pole layer 24 easily.

Figure 4:
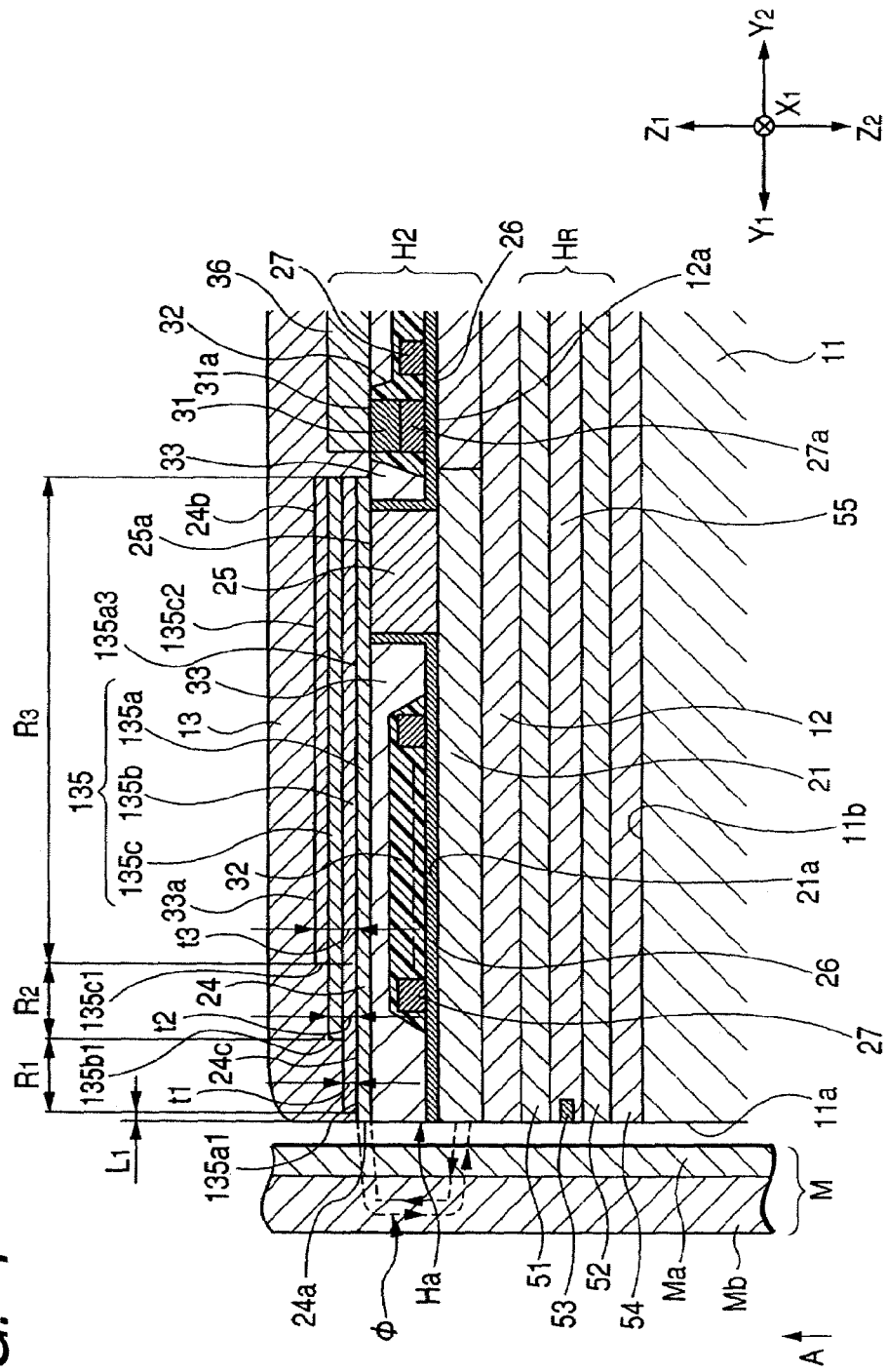
FIG. 4 is a longitudinal cross-sectional view showing the structure of a perpendicular magnetic recording head according to a second embodiment of the invention.
Figure 5:
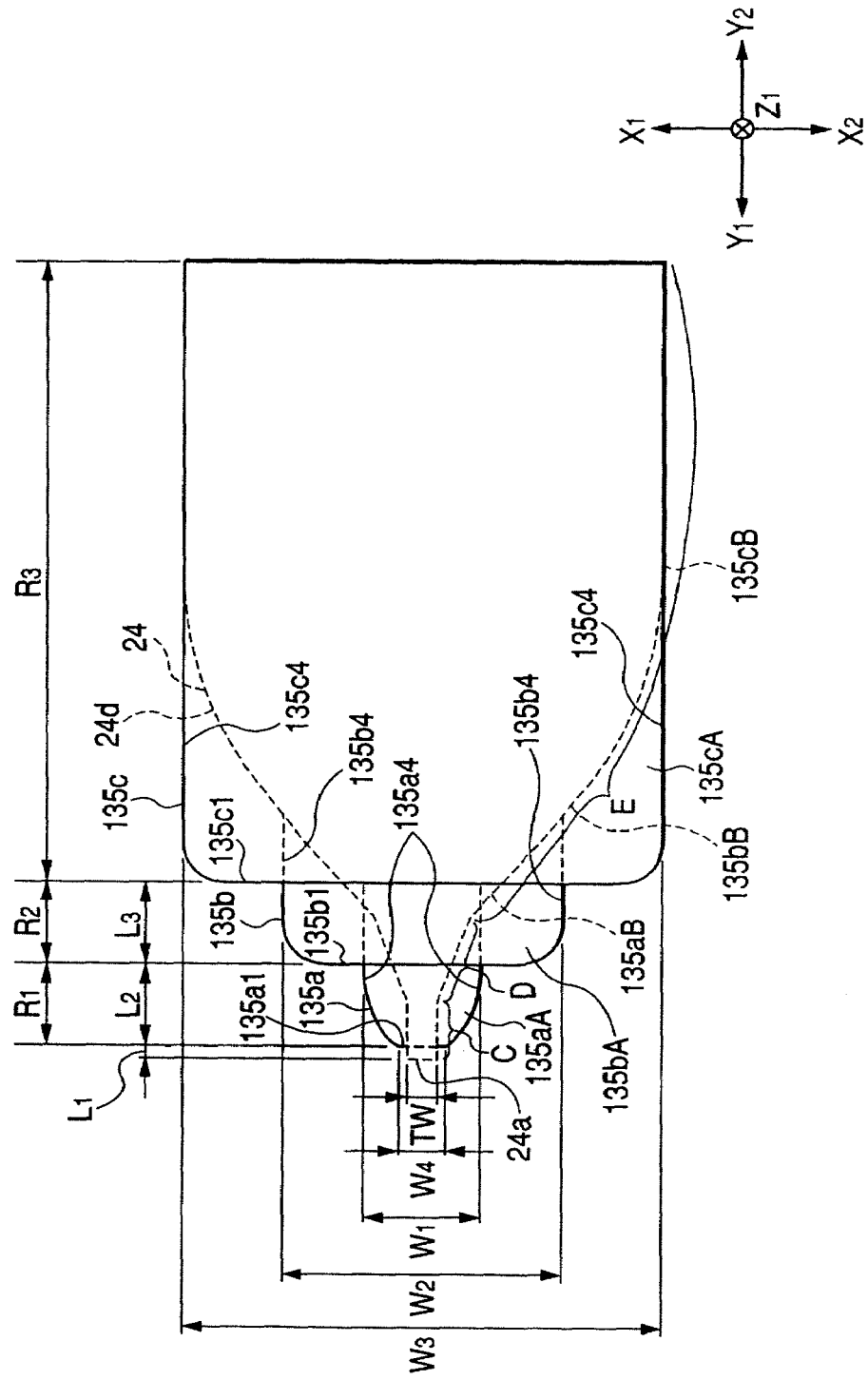
FIG. 5 is a plan view of the perpendicular magnetic recording head shown in FIG. 4 as viewed from an upper side.
Figure 6:
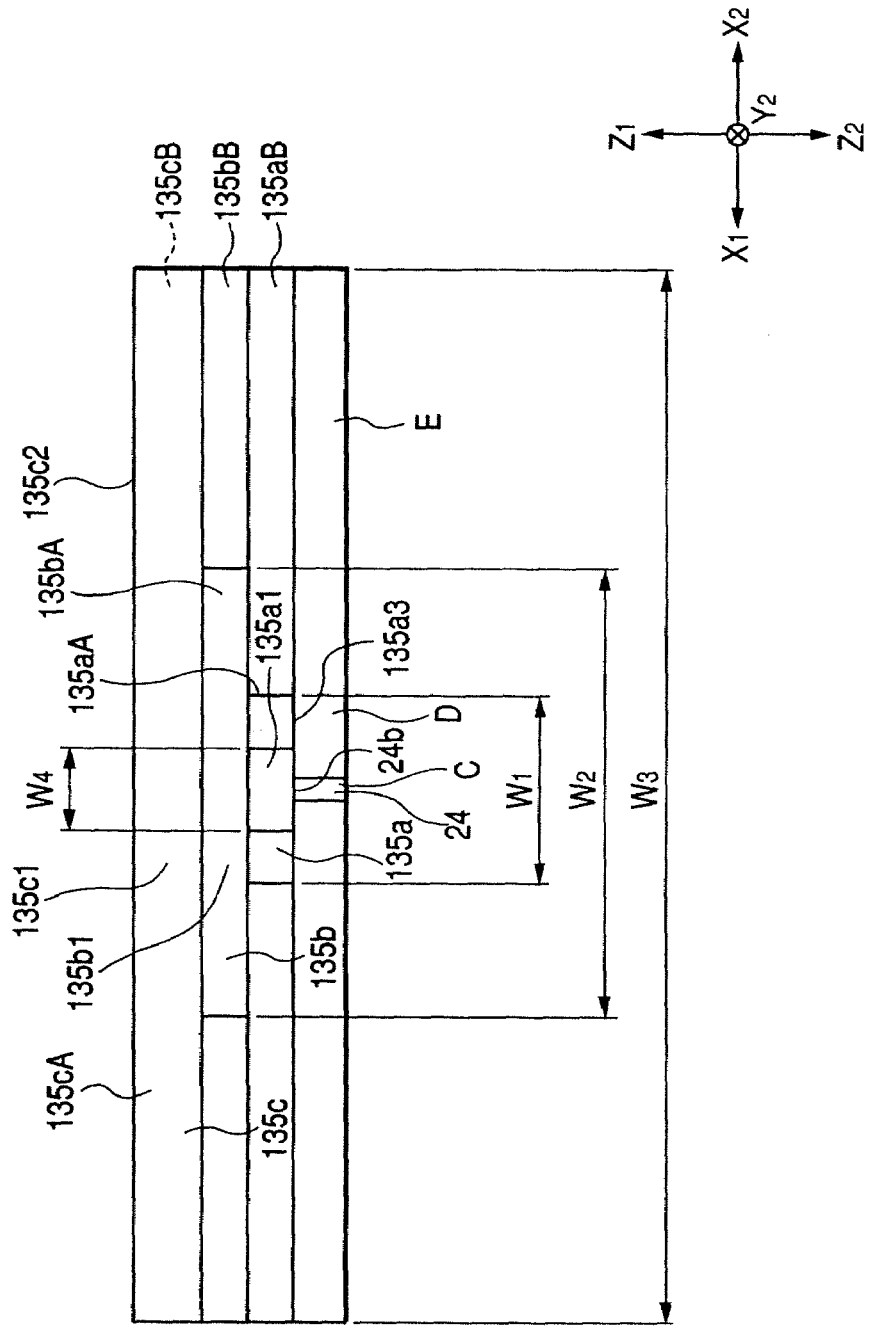
FIG. 6 is a fragmentary front view of the perpendicular magnetic recording head shown in FIG. 4 as viewed from a medium-opposing surface of a recording medium.

FIG. 4 is a longitudinal cross-sectional view showing the structure of a perpendicular magnetic recording head according to a second embodiment of the invention, FIG. 5 is a plan view of the perpendicular magnetic recording head shown in FIG. 4 as viewed from an upper side (from the Z1 direction in FIG. 1), and FIG. 6 is a fragmentary front view of the main magnetic pole layer 24 and the yoke layer 135 of the perpendicular magnetic recording head H1 shown in FIG. 4 as viewed from the medium-opposing surface Ha of the recording medium (from the Y1 direction in the FIG. 4).

A perpendicular magnetic recording head H2 shown in FIGS. 4 to 6 includes the same components as those of the perpendicular magnetic recording head H1 shown in FIGS. 1 to 3. Therefore, in the perpendicular magnetic recording head H2, the same components as those of the perpendicular magnetic recording head H1 are denoted by the same reference numerals, and the detailed description thereof will be omitted.

The perpendicular magnetic recording head H2 shown in FIGS. 4 to 6 is different from the perpendicular magnetic recording head H1 shown in FIGS. 1 to 3 in a location where the yoke layer 135 is formed. As shown in FIGS. 4 to 6, the yoke layer 135 is formed on the main magnetic pole layer 24. In the perpendicular magnetic recording head H2, the yoke layer 135 is a laminated structure that from the bottom, a first layer 135a, a second layer 135b, and a third layer 135c are laminated. Therefore, in the perpendicular magnetic recording head H2, a top surface 135c2 of the third layer 135c becomes the top surface of the yoke layer 135, and a bottom surface 135a3 of the first layer 135a becomes the bottom surface of the yoke layer 135.

As shown in FIGS. 4 and 6, a bottom surface 135a3 of the first layer 135a constituting the yoke layer 135 is formed adjacently to a top surface 24c of the main magnetic layer 24. A second layer 135b is formed in contact with the top surface of the first layer 135a. The front end surface 135b1 of the second layer 135b is formed a predetermined distance L2 away from the front end surface 135a1 of the first layer 135a. The front end surface 135c1 of the third layer 135c is formed a predetermined distance L3 away from the front end surface 135b1 of the second layer 135b. Therefore, as shown in FIGS. 4 and 5, the front end surface 135a1 of the first layer 135a is constructed as the front end surface of the yoke layer 135. Further, when the yoke layer 135 is seen in the height direction (from the Y2 direction in the drawing), the yoke layer 135 includes an area R1 where only the first layer 135a is formed, an area R2 where two layers of the first layer 135a and the second layer 135b are formed, and an area R3 where three layers of the first layer 135a, the second layer 135b, and the third layer 135c are formed. For example, the distance L2 is 0.1 to 10 μm and the distance L3 is 0.1 to 10 μm.

As shown in FIG. 4, the front end surface 135a1 of the first layer 135a is formed at the location farther by the predetermined distance L1 than the front end surface 24a of the main magnetic pole layer 24 in the height direction (in the Y2 direction in FIG. 1). The side of the medium-opposing surface Ha of the recording medium rather than the front end surface 135a1 of the first layer 135a (in the Y1 direction in the drawing, that is, a direction opposite to the height direction) is covered with the insulating layer 13, and the front end surface 135a1 of the first layer 135a constituting the front end of the yoke layer 135 is not shown at the medium-opposing surface Ha of the recording medium. The yoke layer 135 is recessed by the distance L1 from the front end surface 24a of the main magnetic pole layer 24 (the medium-opposing surface Ha of the recording medium) to the front end surface 135a1 of the first layer 135. For example, the distance L1 is 0 to 10 µm.

As shown in FIGS. 5 and 6, a maximum width W1 of the front portion 135aA of the first layer 135a is smaller than a maximum width W2 of the front portion 135bA of the second layer 135b. In addition, the maximum width W2 of the front portion 135bA of the second layer 135b is smaller than the maximum width W3 of the front portion 135cA of the third layer 135c. Therefore, when the yoke layer 135 is seen with respect to the front portion 135aA, 135bA, and 135cA, as going in the height direction (in the Y2 direction in the drawing), the width becomes larger from W1 to W2 and W3 gradually. For example, the relationships between the widths W1, W2, and W3 are 0.01 µm≦W1≦W2≦W3≦100 µm.

As shown in FIG. 5, the width W4 in a direction (the Y1-Y2 direction in the drawing) that is orthogonal to the height direction of the front end surface 135a1 of the first layer 135a and that is the front end of the yoke layer 135 increases to the width W1 and increases from the width W2 to the width W3 as going in the height direction (in the Y2 direction in the drawing).

As shown in FIG. 4, the yoke layer 135 is constructed so as to have the same thickness t1 as the thickness of the first layer 135a in the area R1. In the area R2, the yoke layer 135 is constructed so as to have a thickness t2 which is a sum of the thickness of the first layer 135a and the thickness of the second layer 135b. In the area R3, the yoke layer 135 is constructed so as to have a thickness t3 which is a sum of the thickness of the first layer 135a, the thickness of the second layer 135b, and the thickness of the third layer 135c. That is, the yoke layer 135 is constructed such that the thickness thereof becomes larger from t1 to t2 and t3 as going in the height direction (in the Y2 direction in the drawing). For example, the thickness t1, the thickness t2, and the thickness t3 become larger gradually within 0.01 to 100 µm.

In addition, as shown in FIG. 6, when the yoke layer 135 is seen with respect to the front portion 135aA, 135bA, and 135cA, the maximum width W1 of the front portion 135aA of the first layer 135a located at the lowest (in the Z2 direction in the drawing) is the smallest, the maximum width W2 of the front portion 135bA of the second layer 135b that is located at the intermediate and that is formed on the first layer 135a is larger than the maximum width W1 of the front portion 135aA of the first layer 135a, and the maximum width W3 of the front portion 135cA of the third layer 135c located at the highest (in the Z1 direction in the drawing) is larger than the maximum width W1 of the front portion 135aA of the first layer 135a and the maximum width W2 of the front portion 135bA of the second layer 135b. That is, when the yoke layer 135 is seen with respect to the front portion 135aA, 135bA, and 135cA, as going from the bottom surface 135a3 of the first layer 135a serving as the bottom to the top surface 135c2 of the third layer 135c serving as the top (as going in the Z1 direction which is an upward direction), the width becomes larger from W1 to W2 and W3 gradually.

In the perpendicular magnetic recording head H2 shown in FIGS. 4 to 6, the front end surface 135a1 of the first layer 135a that is the front end of the yoke layer 135 are constructed such that all of the width W4 and the thickness become larger gradually as going in the height direction (in the Y2 direction in the drawing). That is, as the yoke layer 135 goes toward the medium-opposing surface Ha of the recording medium, the width and the thickness become smaller. Thus, the magnetic volume of the yoke layer 135 can become smaller gradually as going toward the medium-opposing surface Ha of the recording medium. Therefore, even though the yoke layer 135 approaches the medium-opposing surface Ha of the recording medium in order to induce the recording magnetic field in the main magnetic pole layer 24 effectively, the recording magnetic field cannot easily flow to the recording medium M from the yoke layer 135, so that the side fringing can be suppressed.

In addition, since the width and the thickness of the yoke layer 135 become larger as going in the height direction (in the Y2 direction in the drawing), the farther it goes from the medium-opposing surface Ha of the recording medium, the larger the magnetic volume becomes. Therefore, since it is possible to enlarge the magnetic volume of the yoke layer 135 as a whole, the recording magnetic field can be easily induced in the main magnetic pole layer 24.

In the yoke layer 135, the width W4 becomes larger as going from the bottom surface 135a3 of the first layer 135a constituting the bottom to the top surface 135c2 of the third layer 135c constituting the top, that is, the width W4 becomes larger as going farther from the main magnetic pole layer 24. Therefore, since it is possible to enlarge the magnetic volume of the yoke layer 135 as a whole, the recording magnetic field can be effectively induced in the main magnetic pole layer 24 easily.

As described above, in the perpendicular magnetic recording head H2 of the invention, even though the yoke layer 135 approaches the medium-opposing surface Ha of the recording medium in order to induce the recording magnetic field in the main magnetic pole layer 24 effectively, the magnetic volume of the yoke layer 135 can become smaller as going toward the medium-opposing surface Ha of the recording medium, so that the side fringing can be suppressed. Further, since it is possible to enlarge the magnetic volume of the yoke layer 135 as a whole, the recording magnetic field can be effectively induced in the main magnetic pole layer 24 easily.

In the perpendicular magnetic recording head H1 shown in FIGS. 1 to 3 and in the perpendicular magnetic recording head H2 shown in FIGS. 4 to 6, the embodiments in which the yoke layer 135 is constructed by three layers of the first layer 135a, the second layer 135b, and the third layer 135c are exemplified. However, in the perpendicular magnetic recording head H1 and the perpendicular magnetic recording head H2, the yoke layer 135 is not limited to three-layer-structure. For example, two or four layers can construct the yoke layer 135.

In addition, preferably, the yoke layer 135 is constructed such that its saturation magnetic flux density increases as approaching the main magnetic pole layer 24. For example, by changing the materials used in the first layer 135a, the second layer 135b, and the third layer 135c, the saturation magnetic flux density can increase as approaching the main magnetic pole layer 24. In this way, since the magnetic flux can be concentrated on the front end of the main magnetic pole layer 24, the recording density can be improved.

Figure 7:
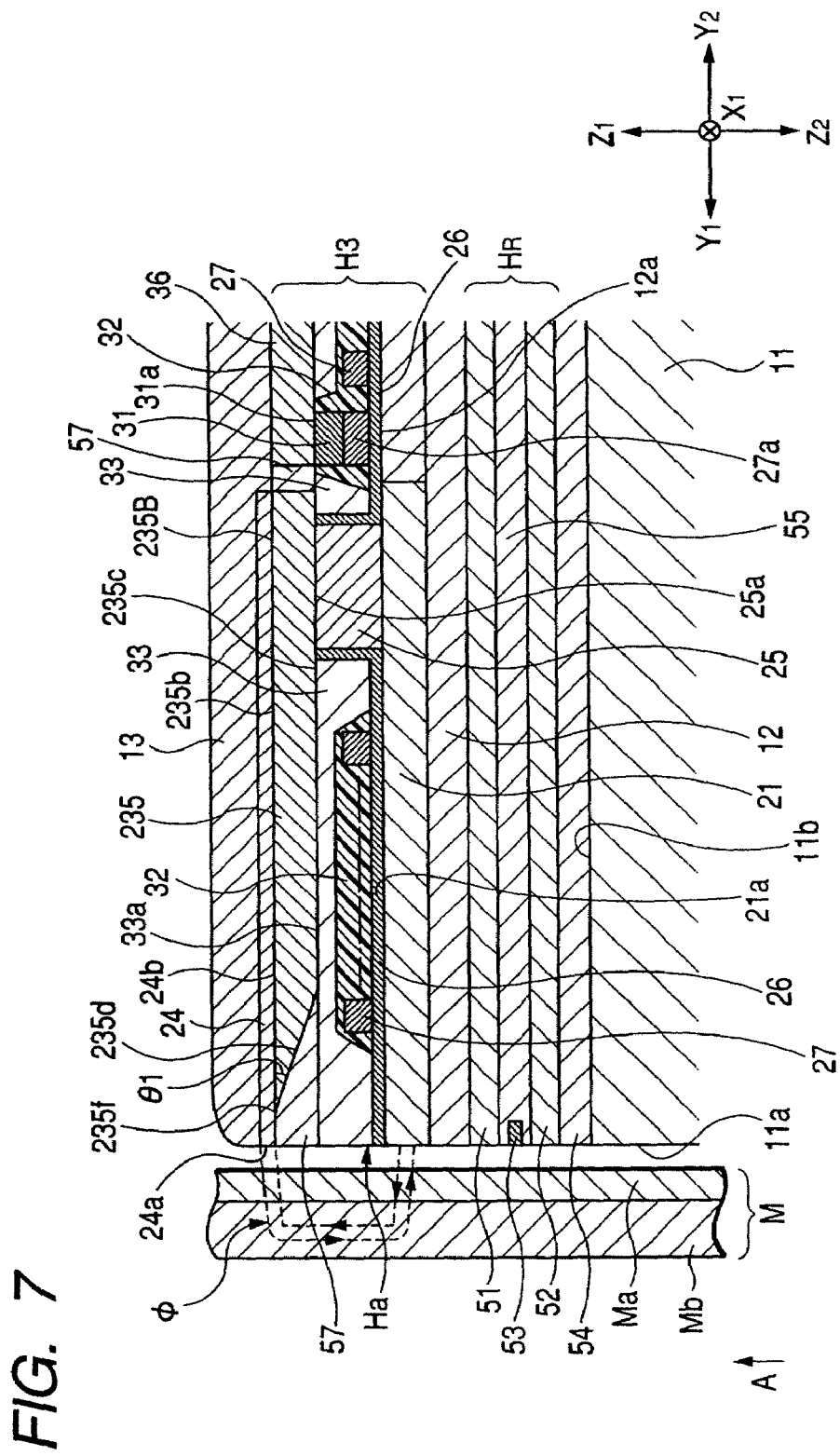
FIG. 7 is a longitudinal cross-sectional view showing a perpendicular magnetic recording head according to a third embodiment of the invention.
Figure 8:
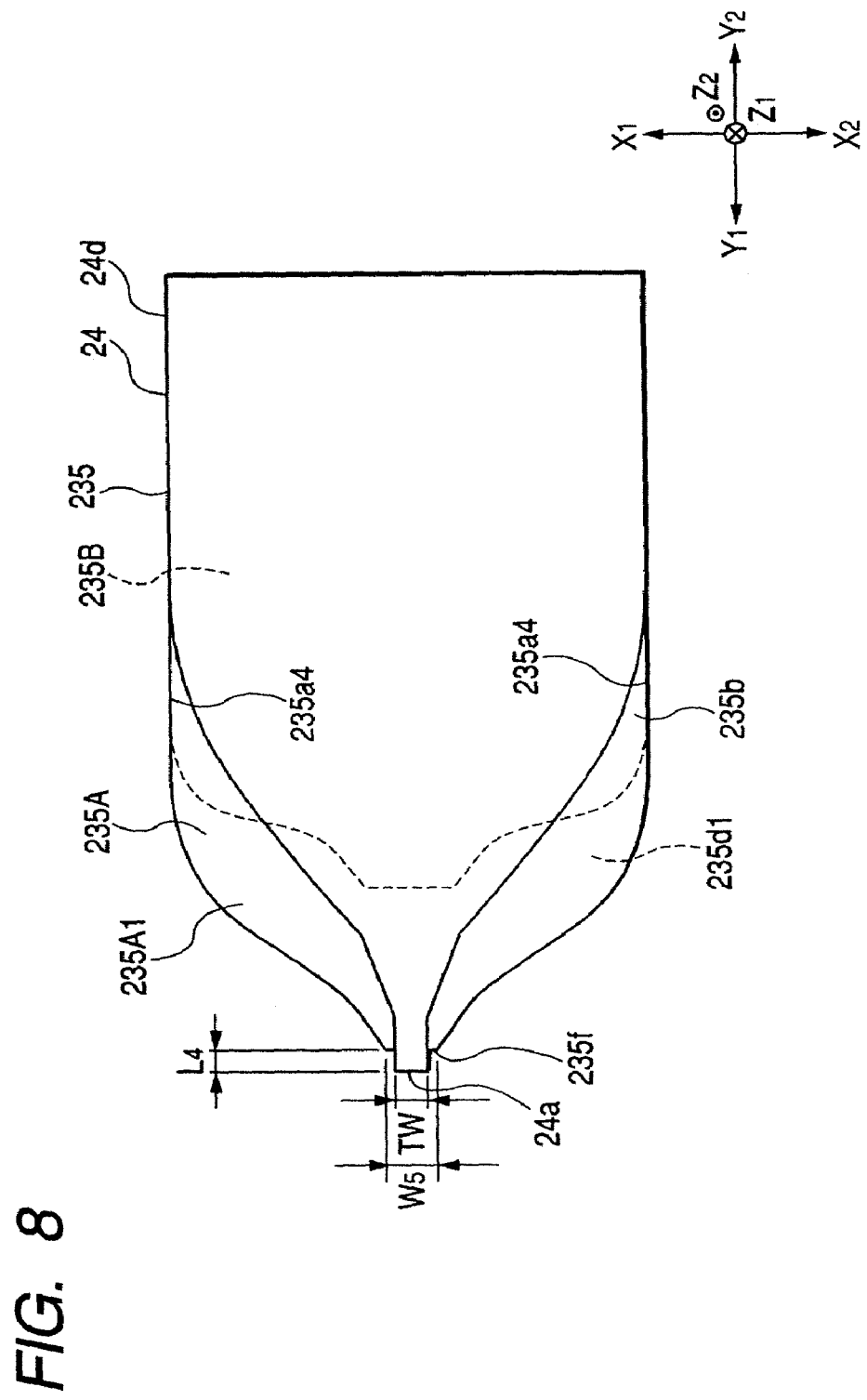
FIG. 8 is a plan view of the perpendicular magnetic recording head shown in FIG. 7 as viewed from an upper side.
Figure 9:
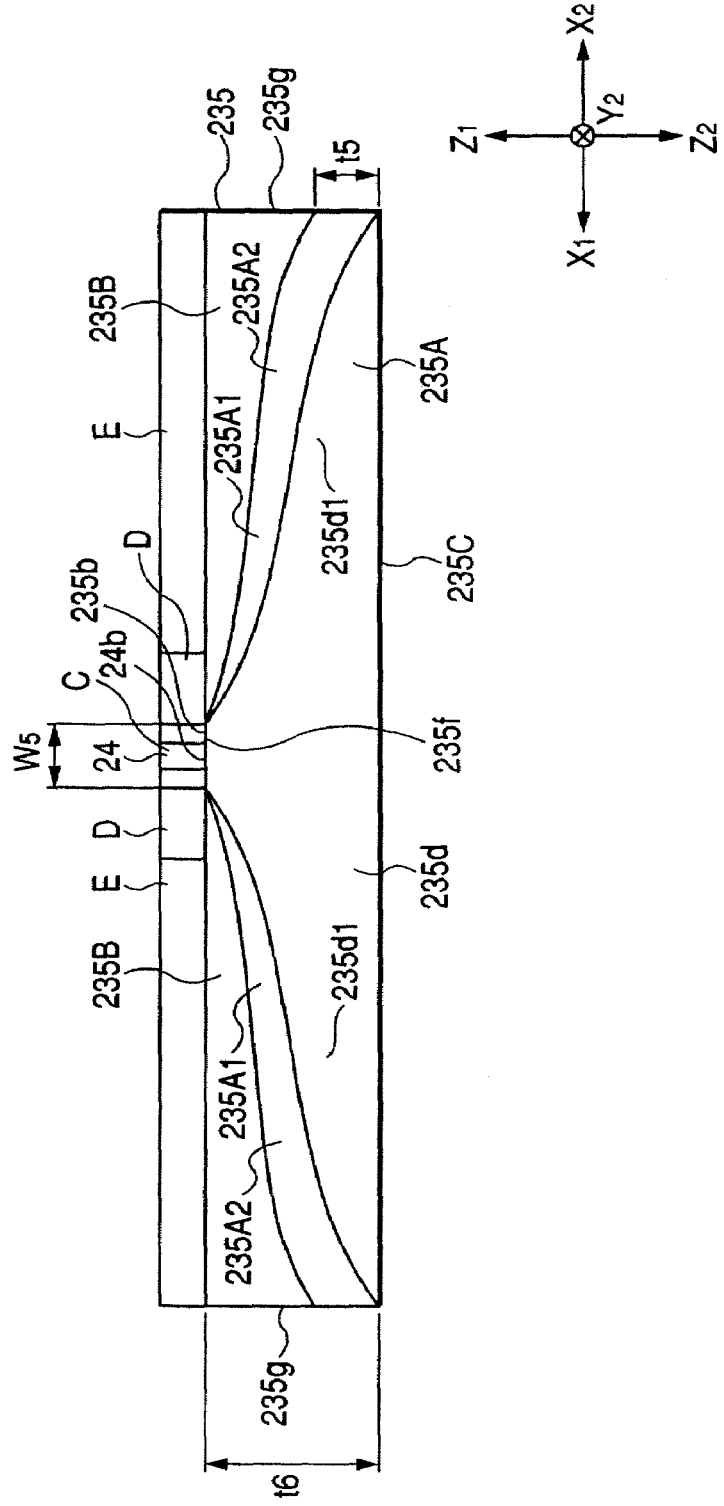
FIG. 9 is a fragmentary front view of the perpendicular magnetic recording head shown in FIG. 7 as viewed from a medium-opposing surface of a recording medium.

In addition, the yoke layer 135 of the perpendicular magnetic recording head H1 shown in FIGS. 1 and 3 may be an integrated yoke layer 235 according to a third embodiment shown in FIGS. 7 to 9.

As shown in FIGS. 7 and 8, a yoke layer 235 is buried in an insulating layer 57, the insulating layer 57 is shown from the medium-opposing surface Ha of the recording medium, and a front end 235f of the yoke layer 235 is located in the height direction from the opposing surface Ha.

As shown in FIG. 8, the front end 235f of the yoke layer 235 is formed at a location farther by a predetermined distance L4 than a front end surface 24a (the medium-opposing surface Ha of the recording medium) of a main magnetic pole layer 24 in the height direction (in the Y2 direction in the drawing). The yoke layer 235 is recessed by the distance L4 from the front end surface 24a of the main magnetic pole layer 24 (the medium-opposing surface Ha of the recording medium) to a front end 235f of the yoke layer 235. For example, the distance L4 is within a range of 0 to 10 μm.

In this way, in the perpendicular magnetic recording head H3, since the front end 235f of the yoke layer 235 is formed at the location farther by the predetermined distance L4 than the front end surface 24a of the main magnetic pole layer 24 in the height direction (in the Y2 direction in the drawing), a leakage magnetic field cannot easily flow to the recording medium M from the yoke layer 235, thus the side fringing can be effectively suppressed.

As shown in FIG. 8, the yoke layer 235 has a front portion 235A whose width gradually becomes larger from the front end 235f and which extends in the height direction and a rear portion 235B which extends in the height direction from the front portion 235A.

In addition, the front portion 235A of the yoke layer 235, as going in the height direction from the front end 235f, extends a location where a side edge portion 235a4 of the yoke layer 235 faces the main magnetic pole layer 24 in the thickness direction (in the Z1-Z2 direction in the drawing). The rear portion 235B is constructed in the height direction from the position where the side edge portion 235a4 of the yoke layer 235 faces the main magnetic pole layer 24 in the thickness direction. As shown in FIG. 8, the rear portion 235B is formed such that the planar shape seen from the upper side is formed along the circumference 24d of the main magnetic pole layer 24.

In the yoke layer 235, a width W5 whose direction is orthogonal to the height direction of the front end 235f of the yoke layer 235 gradually becomes larger continuously as going in the height direction (in the Y2 direction in the drawing), as shown in FIG. 8.

In addition, as shown in FIG. 9, in the front portion 235A of the yoke layer 235, an upper inclined surface 235A2 which descends downward (in the Z2 direction in the drawing) as approaching both side end surfaces 235g and 235g of the yoke layer 235 is formed on a top surface 235A1 of the front portion 235A. In addition, on the front end surface 235d of the front portion 235A, a lower inclined surface 235d1 which descends downward as approaching both side end surfaces 235g and 235g of the yoke layer 235 is formed. From both side end portions of the front end 235f of the yoke layer 235, the thickness becomes gradually larger so as to have a thickness t5 at both of the side end surfaces 235g and 235g.

Therefore, the width W5 whose direction is orthogonal to the height direction of the front end 235f of the yoke layer 235 becomes larger continuously, as going toward a bottom surface 235c from a top surface 235b (as going in the Z2 direction that is a downward direction). That is, the farther it goes from the main magnetic pole layer 24, the larger the width W5 becomes.

On the other hand, the rear portion 235B is formed so as to have a constant thickness. It is preferable that a thickness t6 of the rear portion 235B be larger than the front end 235f of the front portion 235A. When the rear portion 235B is constructed to have the large thickness in this way, it is possible to enlarge a magnetic volume of the yoke layer 235 as a whole. As a result, the recording magnetic field can be easily induced in the main magnetic pole layer 24.

In addition, as shown in FIG. 7, the front end surface 235d of the yoke layer 235 is formed into an inclined surface close to the opposing surface Ha toward the top surface 235b from the bottom surface 235c. Therefore, in the front end surface 235d formed into an inclined surface, as going in the height direction (in the Y2 direction in the drawing), the thickness continuously becomes larger. An internal angle θ1 between the bottom surface 24b of the main magnetic pole layer 24 formed on the yoke layer 235 and the front end surface 235d of the yoke layer 235 is preferably set in range of 0 to 150°. The front end surface 235d is formed into an inclined surface and the internal angle θ1 is set in the range, so that the recording magnetic field can be easily suppressed from flowing into the recording medium M from the yoke layer 235, thereby suppressing the side fringing.

The front end surface 235d may be formed to become a curved surface which protrudes toward the medium-opposing surface Ha of the recording medium (in the Y1 direction in FIG. 7). Otherwise, the front end surface 235d may be formed to become a curved surface which is concaved in the height direction (in the Y2 direction in FIG. 7).

Figure 10:
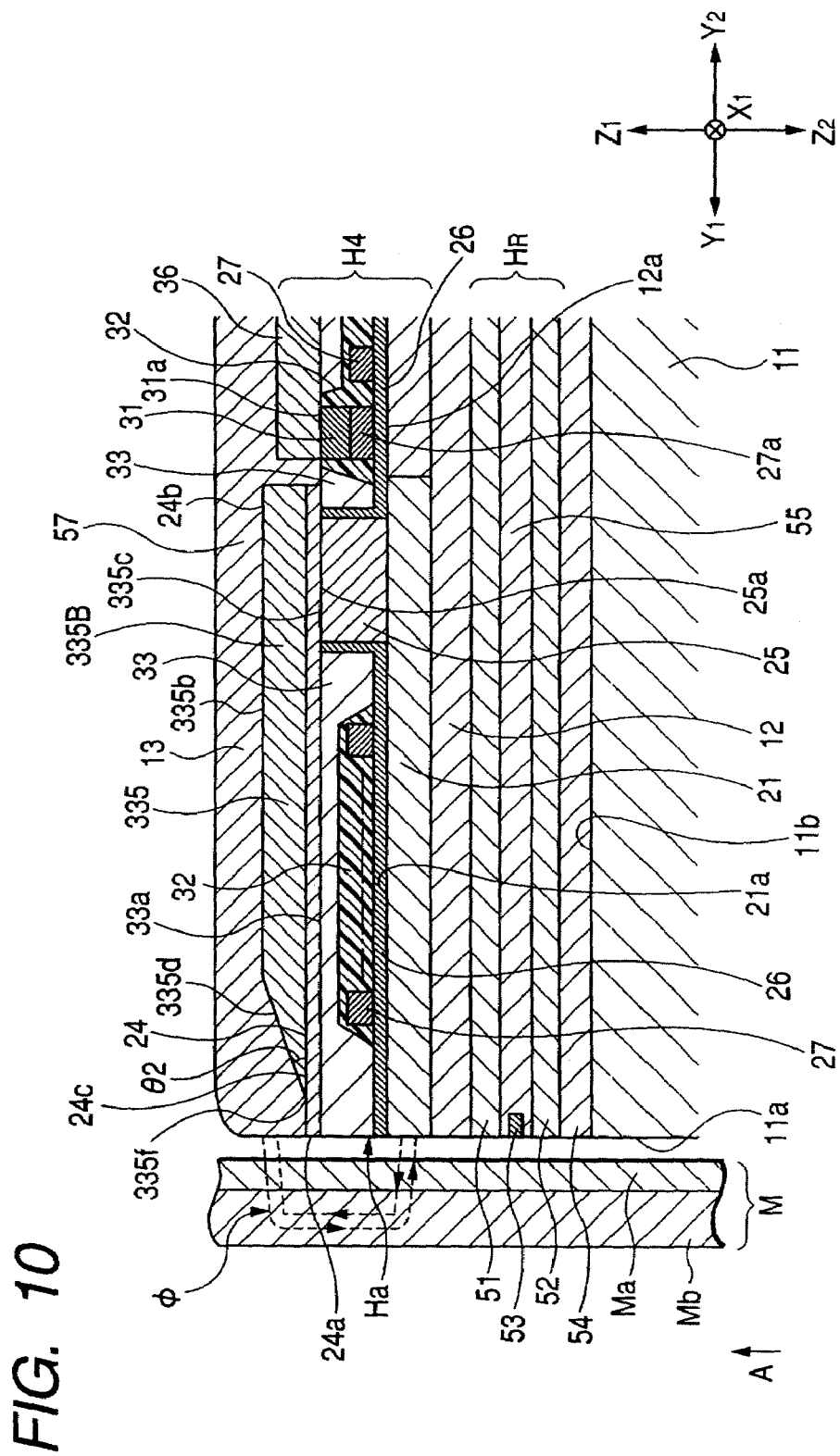
FIG. 10 is a longitudinal cross-sectional view showing a perpendicular magnetic recording head according to a fourth embodiment of the invention.
Figure 11:
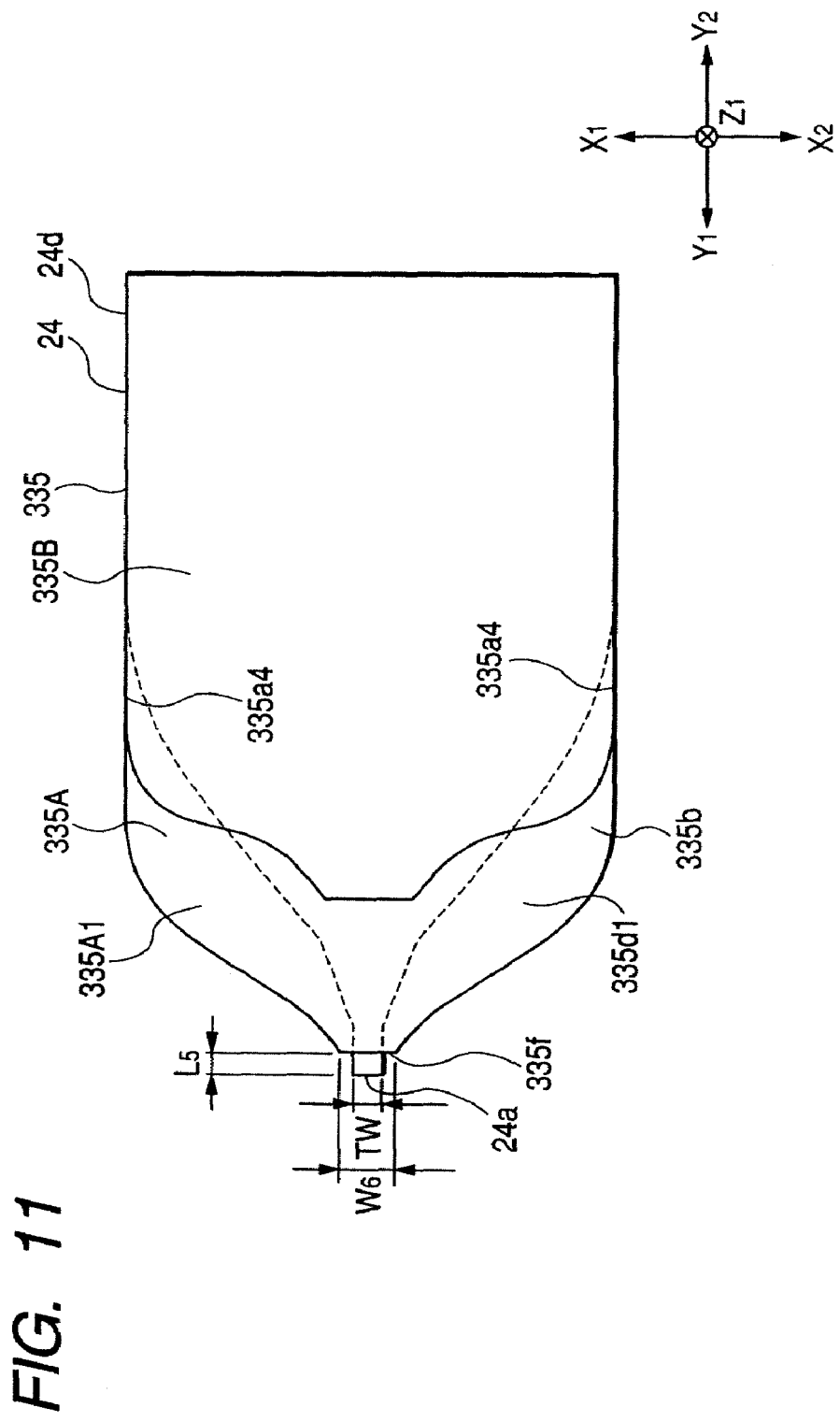
FIG. 11 is a plan view of the perpendicular magnetic recording head shown in FIG. 10 as viewed from an upper side.
Figure 12:
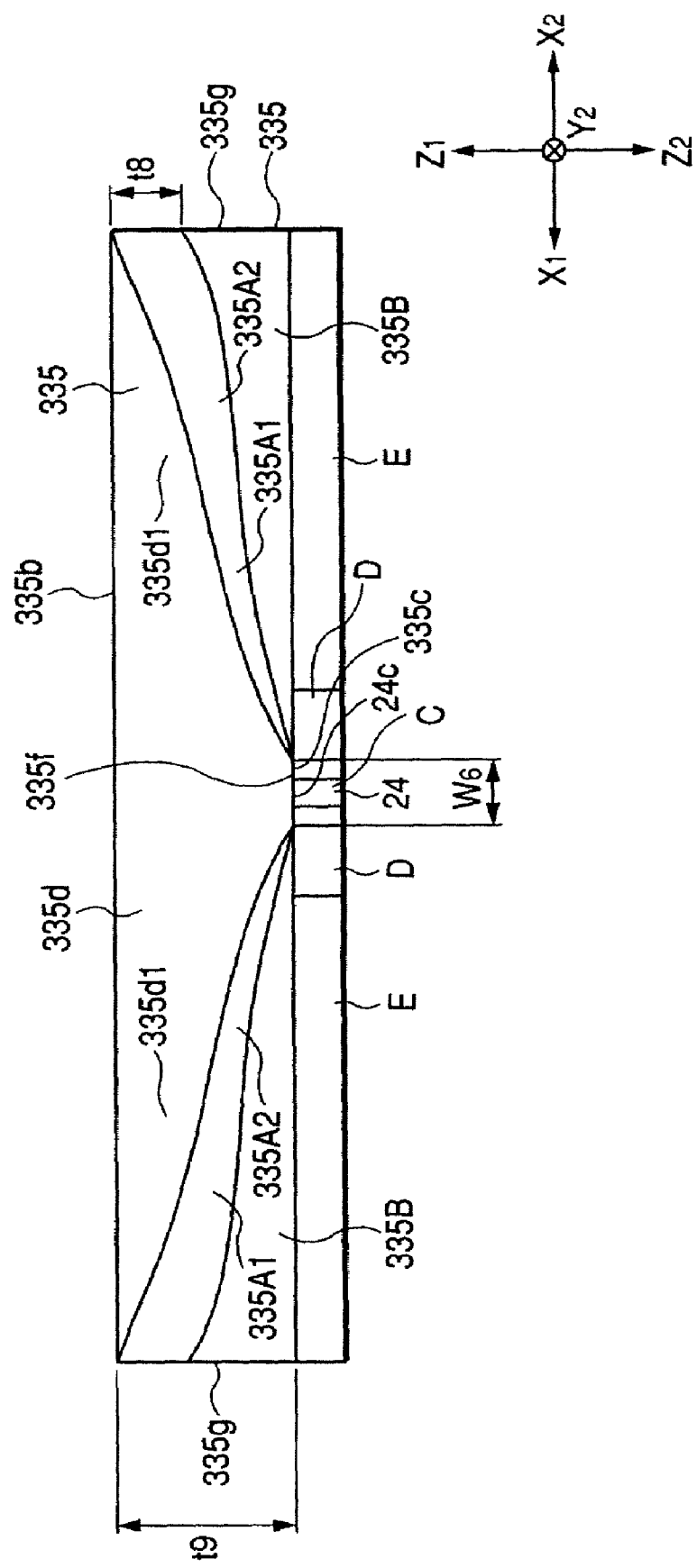
FIG. 12 is a fragmentary front view of the perpendicular magnetic recording head shown in FIG. 10 as viewed from a medium-opposing surface of a recording medium.

In addition, the yoke layer 135 of the perpendicular magnetic recording head H2 shown in FIGS. 4 to 6 may be an integrated yoke layer 335 of a perpendicular magnetic recording head H4 according to a fourth embodiment shown in FIGS. 10 to 12.

As shown in FIGS. 10 and 11, in the vertical recording magnetic head H4, the yoke layer 335 is covered with an insulating layer 57, the insulating layer 57 is shown from the medium-opposing surface Ha of the recording medium, and a front end 335f of the yoke layer 335 is located behind the opposing surface Ha in the height direction.

As shown in FIG. 11, the front end 335f of the yoke layer 335 is formed at a location farther by a predetermined distance L5 than the front end surface 24a (the medium-opposing surface Ha of the recording medium) of the main magnetic pole layer 24 in the height direction (in the Y2 direction in the drawing). The yoke layer 335 is recessed by the distance L5 from the front end surface 24a of the main magnetic pole layer 24 (the medium-opposing surface Ha of the recording medium) to the front end 335f of the yoke layer 335. For example, the distance L5 is in a range of 0 to 10 μm.

As shown in FIG. 11, the yoke layer 335 has a front portion 335A whose width gradually becomes larger from the front end 335f and which extends in the height direction and a rear portion 335B which extends in the height direction from the front portion 335A.

In addition, the front portion 335A of the yoke layer 335, as going in the height direction from the front end 335f, extends to a position where a side edge portion 335a4 of the yoke layer 335 faces the main magnetic pole layer 24 in the thickness direction (in the Z1-Z2 direction in the drawing). In addition, the rear portion 335B is constructed in the height direction from the position where the side edge portion 335a4 of the yoke layer 335 faces the main magnetic pole layer 24 in the film thickness direction. As shown in FIG. 11, the rear portion 335B is formed such that the planar shape seen from the upper side is formed along the circumference 24d of the main magnetic pole layer 24.

In the yoke layer 335, a width W6 whose direction is orthogonal to the height direction of the front end 335f of the yoke layer 335 gradually becomes larger continuously in the height direction (in the Y2 direction in the drawing), as shown in FIG. 11.

In addition, as shown in FIG. 12, in the front portion 335A of the yoke layer 335, a lower inclined surface 335A2 which ascends upward (in the Z1 direction in the drawing) as approaching both side end surfaces 335g and 335g of the yoke layer 335 is formed on a bottom surface 335A1 of the front portion 335A. In addition, on the front end surface 335d of the front portion 335A, an upper inclined surface 335d1 which ascends upward as approaching both side end surfaces 335g and 335g of the yoke layer 335 is formed. From both side end portions of the front end 335f of the yoke layer 335, the thickness becomes gradually larger so as to have the thickness t8 at both of the side end surfaces 335g and 335g.

Therefore, a width W6 whose direction is orthogonal to the height direction of the front end 335f of the yoke layer 335 becomes larger continuously, as going toward a bottom surface 335c from a top surface 335b (in the Z1 direction that is an upward direction). That is, the farther it goes from the main magnetic pole layer 24, the larger the width W6 becomes.

On the other hand, the rear portion 335B is formed so as to have a constant thickness. It is preferable that a thickness t9 of the rear portion 335B be larger than the front end 335f of the front portion 335A. When the rear portion 335B is constructed to have the large thickness in this way, it is possible to enlarge a magnetic volume of the yoke layer 335 as a whole, so that the recording magnetic field can be easily induced in the main magnetic pole layer 24.

In addition, as shown in FIG. 10, the front end surface 335d of the yoke layer 335 is formed on an inclined surface close to the opposing surface Ha toward the bottom surface 335c from the top surface 335b. Therefore, in the front end surface 335d formed on the inclined surface, as going in the height direction (in the Y2 direction in the drawing), the thickness continuously becomes larger. An internal angle θ2 between the top surface 24c of the main magnetic pole layer 24 formed below the yoke layer 335 and the front end surface 335d of the yoke layer 335 is preferably set in range of 0 to 150°. Since the front end surface 335d is formed into an inclined surface and the internal angle θ2 is set in the range, the recording magnetic field can be easily suppressed from flowing to the recording medium M from the yoke layer 335, so that the side fringing can be suppressed.

In addition, the front end surface 335d may be formed to become a curved surface which protrudes toward the medium-opposing surface Ha of the recording medium (in the Y1 direction in FIG. 10). Alternatively, the front end surface 335d may be formed to become a curved surface which is concaved in the height direction (in the Y2 direction in FIG. 10).

In the perpendicular magnetic recording head H3 shown in FIGS. 7 to 9 and in the perpendicular magnetic recording head H4 shown in FIGS. 10 to 12, in order to improve recording density, the yoke layer 335 is preferable constructed such that its saturation magnetic flux density becomes larger as approaching the main magnetic pole layer 24.

Figure 17:
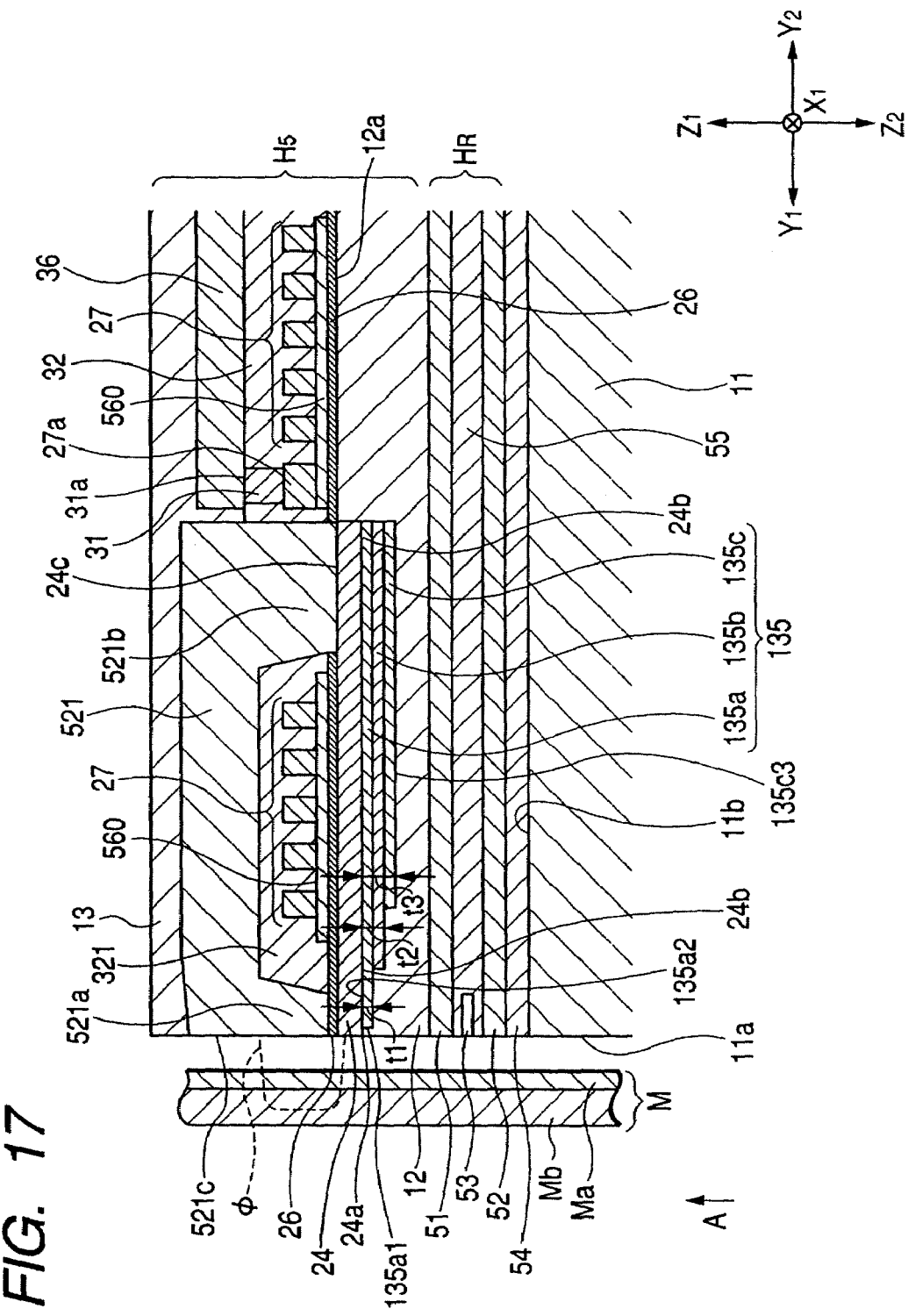
FIG. 17 is a longitudinal cross-sectional view showing a perpendicular magnetic recording head according to a fifth embodiment of the invention.

FIG. 17 is a longitudinal cross-sectional view showing the structure of a perpendicular magnetic recording head H5 according to a fifth embodiment of the invention.

A perpendicular magnetic recording head H5 shown in FIG. 17 applies to the vertical magnetic field Φ to the recording medium M and magnetizes a hard layer Ma of the recording medium M in a vertical direction.

The recording medium M is a disc shape. The recording medium M has the hard layer Ma having high remnant magnetization on the surface thereof and a soft layer Mb having high magnetic permeability therein, and rotates on its center serving as a rotation axis.

A slider 11 of the perpendicular magnetic recording head H5 is made of ceramic materials, such as $Al_2O_3$ or TiC. A surface 11a of the slider 11 faces the recording medium M. Rotation of the recording medium M creates airflow at the medium surface and the airflow allows the slider 11 to float from or slide over the surface of the recording medium M. In FIG. 17, the recording medium M moves in a direction designated by arrow A (in a Z1 direction) with respect to the slider 11. The perpendicular magnetic recording head H5 is provided on a trailing end surface of the slider 11.

The nonmagnetic insulating layer 54 made of inorganic materials such as $Al_2O_3$ or $SiO_2$ is formed on the trailing end surface 11b of the slider 101, and the reading portion $H_R$ is formed on the nonmagnetic insulating layer 54.

A reading portion $H_R$ is composed of, from the bottom, a lower shield layer 52, a gap layer 55, a magneto-resistance effect element 53, and an upper shield layer 51. The magneto-resistance effect element 53 is an anisotropic magneto-resistance (AMR) element, a giant magneto-resistance (GMR) element, or a tunnel magneto-resistance (TMR) element.

A nonmagnetic insulating layer 12 made of inorganic materials, such as $Al_2O_3$ or $SiO_2$, is formed on the upper shield layer 51, and the perpendicular magnetic recording head H5 for recording is provided on the nonmagnetic insulating layer 12. In addition, the perpendicular magnetic recording head H5 is covered with a protecting layer 13 formed of inorganic nonmagnetic insulating materials, etc. An opposing surface Ha of the perpendicular magnetic recording head H5 toward the recording medium and the opposing surface 11a of the slider 11 toward the recording medium are substantially on the same plane.

In the perpendicular magnetic recording head according to the embodiment shown in FIG. 17, a yoke layer 135 made of materials having high permeability, such as Permalloy (Ni—Fe), is formed on the nonmagnetic insulating layer 12. The yoke layer 135 is formed with a higher permeability than the main magnetic pole layer 24, which will be described later.

As shown in FIG. 17, a lower portion of the yoke layer 135 (between the yoke layer 135 and the upper shield layer 51) and the vicinity of the yoke layer 135 is buried in the nonmagnetic insulating layer 12, the nonmagnetic insulating layer 12 is shown from the medium-opposing surface Ha of the recording medium. In addition, a portion which constitutes the front end of the yoke layer 135 and which is denoted by a reference numeral 135a1 is located behind the opposing surface Ha in the height direction. In the invention, a top surface of the yoke layer 135 is planarized so as to be located on the same plane by utilizing a CMP (chemical mechanical polishing) technology.

It is preferable that the nonmagnetic insulating layer 12 be formed of an inorganic insulating material. As the inorganic insulation materials, one or more can be selected from AlO, $Al_2O_3$, $SiO_2$, $Ta_2O_5$, TiO, AlN, AlSiN, TiN, SiN, $Si_3N_4$, NiO, WO, $WO_3$, BN, CrN, and SiON.

In addition, on the planarized yoke layer 135, the main magnetic pole layer 24 serving as the second magnetic portion is formed of materials having high saturation magnetic flux density, such as Fe—Co—Rh, Fe—Co, and Fe—Co—Ni. As shown in FIG. 17, the main magnetic pole layer 24 is formed above an auxiliary magnetic pole layer 21, that is, at a trailing side of the auxiliary magnetic pole layer 21 (in the Z1 direction in the drawing).

In addition, the top surface 24c of the main magnetic pole layer 24 and the top surface of the nonmagnetic insulating layer 12 are equally planarized by utilizing a CMP technology.

In the perpendicular magnetic recording head H5, an auxiliary magnetic pole layer 521 which is the first magnetic portion is formed by plating with Ni—Fe, Fe—Ni (Fe-rich), Fe—Co—Rh, Fe—Co, and Fe—Co—Ni.

As shown in FIG. 17, behind the opposing surface Ha in the height direction (in the Y2 direction in the drawing), a connecting portion 521b of the auxiliary magnetic pole layer 521 is formed on the top surface 24c of the main magnetic pole layer 24, and is magnetically connected.

In the vicinity of the connecting portion 521b, the nonmagnetic insulating layer 26, such as $Al_2O_3$, is formed on the top surface 24c of the main magnetic pole layer 24 and the surface 12a of the nonmagnetic insulating layer 12, and the coil layer 27 is formed of a conductive material, such as Cu, on the nonmagnetic insulating layer 26. The coil layer 27 is formed by a frame plating method, and the coil layer 27 is spirally pattern-formed to be wound by a predetermined winding number in the vicinity of the connecting portion 521b. A bottom raising layer 31 is formed of a conductive material, such as Cu, on a connecting end 27a at the winding center of the coil layer 27.

The coil layer 27 and the bottom raising layer 31 are covered with an insulating layer 321 made of an organic material, such as a resist material.

As shown in FIG. 17, a lead layer 36 is formed on the surface 31a of the bottom raising layer 31, and a recording current can be supplied to the bottom raising layer 31 and the coil layer 27 from the lead layer 36. In addition, the yoke layer 135 and the lead layer 36 are covered with the protecting layer 13.

Figure 18:
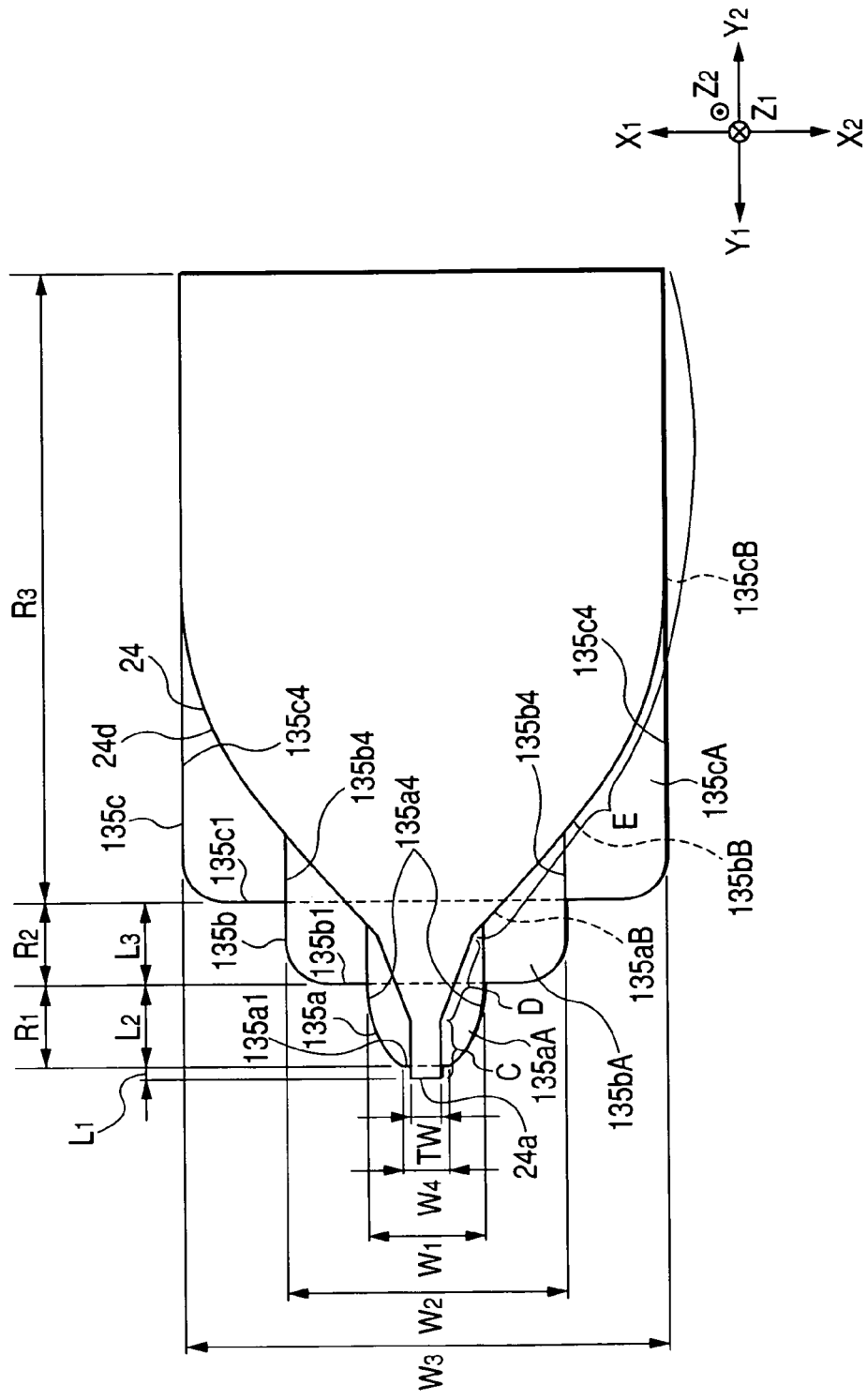
FIG. 18 is a plan view of the perpendicular magnetic recording head shown in FIG. 17 as viewed from an upper side.
Figure 19:
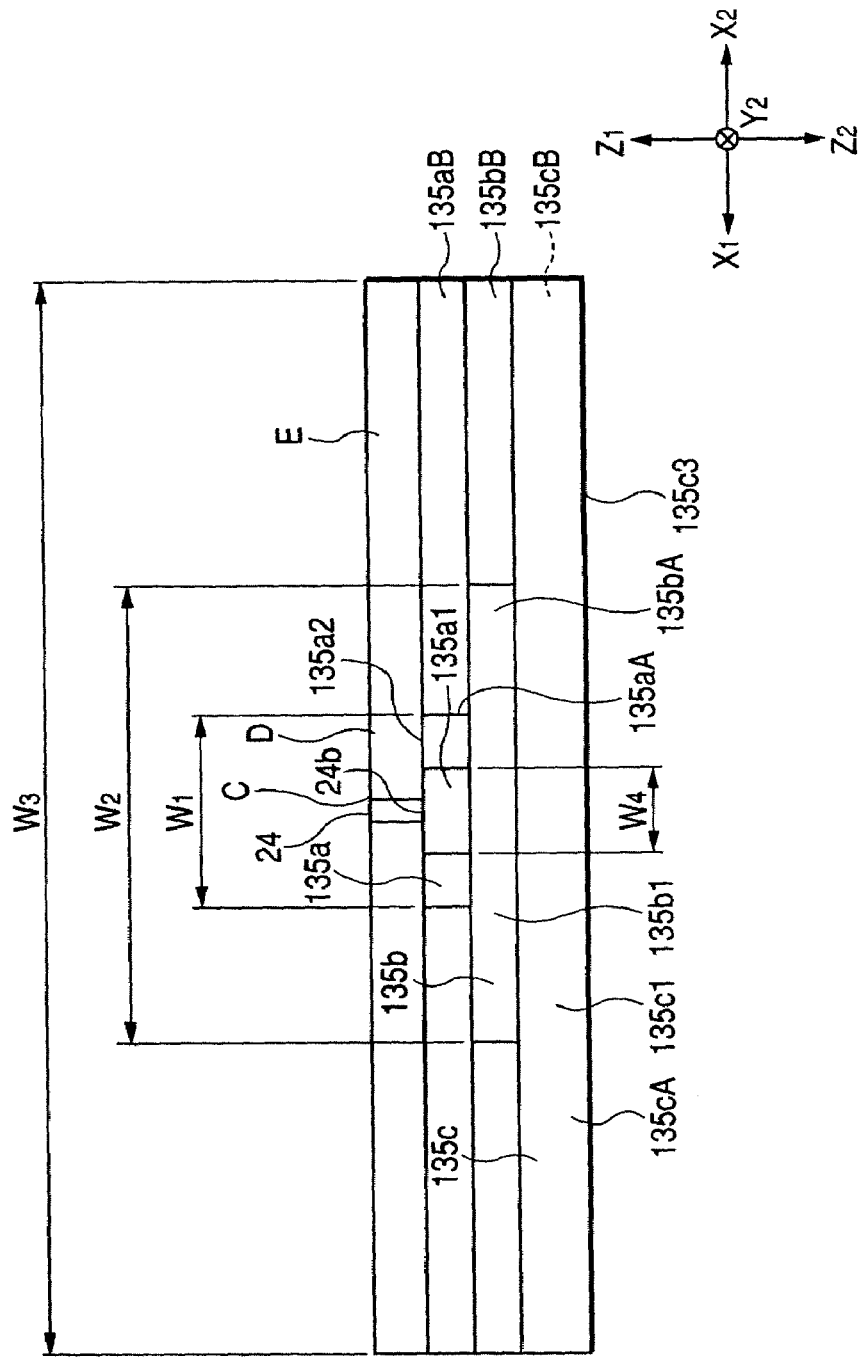
FIG. 19 is a fragmentary front view of the perpendicular magnetic recording head shown in FIG. 17 as viewed from a medium-opposing surface of a recording medium.

FIG. 18 is a plan view of the perpendicular magnetic recording head shown in FIG. 17 as viewed from an upper side (from the Z1 direction shown in FIG. 17). In addition, FIG. 19 is a fragmentary front view showing the main magnetic pole layer 24 and the yoke layer 135 of the perpendicular magnetic recording head H5 shown in FIG. 17 as viewed from the medium-opposing surface Ha (from the Y1 side shown in FIG. 1) of the recording medium. As shown in FIGS. 18 and 19, the main magnetic pole layer 24 is composed of a front end portion C having a constant width (=a track width Tw), an intermediate portion D which has a predetermined angle with respect to the side surface of the front portion C and whose width gradually becomes larger as going from the front end portion C, and a rear end portion E which has an additional predetermined angle with respect to the side surface of the front portion C and is formed from the intermediate portion D.

In the perpendicular magnetic recording head H5 shown in FIG. 17, the nonmagnetic insulating layer 12 and the yoke layer 135 are formed on the upper shield layer 51, and the main magnetic pole layer 24 is formed on the nonmagnetic insulating layer 12 and the yoke layer 135.

As shown in FIG. 17, the yoke layer 135 is a laminated structure in which a first layer 135a, a second layer 135b, and a third layer 135c are laminated. The top surface 135a2 of the first layer 135a which becomes the top surface of the yoke layer 135 is adjacently formed to the bottom surface 24b of the main magnetic pole layer 24. The yoke layer 135 is formed to be located at a leading side that is below the main magnetic pole layer 24 (in the Z2 direction in the drawing).

As shown in FIG. 18, the first layer 135a is constructed to have a front portion 135aA which has a predetermined maximum width W1 and which extends in the height direction, and a rear portion 135aB which extends in the height direction from the front portion 135aA.

The second layer 135b is constructed to have a front portion 135bA which has a predetermined maximum width W2 and which extends in the height direction, and a rear portion 135bB which extends in the height direction from the front portion 135bA.

The third layer 135c is constructed to have a front portion 135cA which has a predetermined maximum width W3 and which extends in the height direction, and a rear portion 135cB which extends in the height direction from the front portion 135cA.

As shown in FIG. 18, the front portion 135aA of the first layer 135a extends to a location where a side edge portion 135a4 of the first layer 135a opposes the main magnetic pole layer 24 in a film thickness direction (in the Z1-Z2 direction in the drawing) while extending in the height direction from the front end surface 135a1. In addition, the rear portion 135aB is constructed in the height direction from the position where the side edge portion 135a4 of the first layer 135a opposes the main magnetic pole layer 24 in the film thickness direction. As shown in FIG. 18, the rear portion 135aB is formed such that the planar shape viewed from the upper side is formed along a circumference 24d of the main magnetic pole layer 24.

In the same manner, the front portion 135bA of the second layer 135b extends to a location where a side edge portion 135b4 of the second layer 135b opposes the main magnetic pole layer 24 in a film thickness direction while extending in the height direction from the front end surface 135b1 of the second layer 135b. In addition, the rear portion 135bB is constructed in the height direction from the position where the side edge portion 135b4 of the second layer 135b opposes the main magnetic pole layer 24 in the film thickness direction. As shown in FIG. 18, the rear portion 135bB is formed such that the planar shape viewed from the upper side is formed along the circumference 24d of the main magnetic pole layer 24.

In the same manner, the front portion 135cA of the third layer 135c extends to a location where a side edge portion 135c4 of the third layer 135c opposes the main magnetic pole layer 24 in a film thickness direction while extending in the height direction from the front end surface 135c1 of the third layer 135c. In addition, the rear portion 135cB is constructed in the height direction from the position where the side edge portion 135c4 of the third layer 135c opposes the main magnetic pole layer 24 in the film thickness direction. As shown in FIG. 18, the rear portion 135cB is formed such that the planar shape viewed from the upper side is formed along the circumference 24d of the main magnetic pole layer 24.

In this way, when the rear portion 135aB of the first layer 135a, the rear portion 135bB of the second layer 135b, and the rear portion 135cB of the third layer 135c have the planar shapes which are formed along the circumference 24d of the main magnetic pole layer 24, magnetic volumes of the first layer 135a, the second layer 135b, and the third layer 135c can enlarge as a whole, which makes the induction of a recording magnetic field in the main magnetic pole easier.

As shown in FIGS. 18 and 19, the top surface 135a2 of the first layer 135a is formed so as to adjacent to a bottom surface 24b of the main magnetic pole layer 24. The second layer 135b is formed in contact with the bottom of the first layer 135a. The front end surface 135b1 of the second layer 135b is formed a predetermined distance L2 away from the front end surface 135a1 of the first layer 135a. In addition, the front end surface 135c1 of the third layer 135c is formed a predetermined distance L3 away from the front end surface 135b1 of the second layer 135b. Therefore, as shown in FIGS. 17 and 18, the front end surface 135a1 of the first layer 135a is constructed as the front end surface of the yoke layer 135. Further, when the yoke layer 135 is seen in the height direction (in the Y2 direction in the drawing), the yoke layer 135 includes an area R1 where only the first layer 135a is formed, an area R2 where two layers of the first layer 135a and the second layer 135b are formed, and an area R3 where three layers of the first layer 135a, the second layer 135b, and the third layer 135c are formed. For example, the distance L2 is 0.01 to 100 µm, and the distance L3 is 0.01 to 100 µm.

As shown in FIG. 18, the front end surface 135a1 of the first layer 135a is formed at a location farther by a predetermined distance L1 than the front end surface 24a (the medium-opposing surface Ha of the recording medium) of the main magnetic pole layer 24 in the height direction (in the Y2 direction in FIG. 1). The side of the medium-opposing surface Ha of the recording medium rather than the front end surface 135a1 of the first layer 135a (in the Y1 direction in the drawing, that is, a direction opposite to the height direction) is covered with the insulating layer 12, and the front end surface 135a1 of the first layer 135a is not shown at the medium-opposing surface Ha of the recording medium. The yoke layer 135 is recessed by the distance L1 from the front end surface 24a of the main magnetic pole layer 24 (the medium-opposing surface Ha of the recording medium) to the front end surface 135a1 of the first layer 135a. For example, the distance L1 is 0 to 10 µm.

As shown in FIGS. 18 and 19, the maximum width W1 of the front portion 135aA of the first layer 135a is smaller than the maximum width W2 of the front portion 135bA of the second layer 135b. In addition, the maximum width W2 of the front portion 135bA of the second layer 135b is smaller than the maximum width W3 of the front portion 135cA of the third layer 135c. Therefore, when the yoke layer 135 is seen with respect to the front portions 135aA, 135bA, and 135cA, the widths becomes increase from W1 to W2 and W3 gradually as going in the height direction (in the Y2 direction in the drawing). For example, the relationships between the widths W1, W2, and W3 are 0.01 µm≦W1≦W2≦W3≦100 µm.

As shown in FIG. 18, a width W4 in a direction (the X1-X2 direction) which is orthogonal to the height direction (the Y1-Y2 direction) of the front end surface 135a1 of the first layer 135a that is the front end of the yoke layer 135 increases to the width W1 and increases from the widths W2 to W3 as going in the height direction (in the Y2 direction).

As shown in FIGS. 17 and 18, the yoke layer 135 is constructed so as to have the same thickness t1 as that of the first layer 135a in the area R1. In addition, in the area R2, the yoke layer 135 is constructed so as to have a thickness t2 which is a sum of the thickness of the first layer 135a and the thickness of the second layer 135b. In addition, in the area R3, the yoke layer 135 is constructed so as to have a thickness t3 which is a sum of the thickness of the first layer 135a, the thickness of the second layer 135b, and the thickness of the third layer 135c. That is, the yoke layer 135 is constructed such that the thickness increases from t1 to t2 and t3 as going downward in the height direction (in the Y2 direction in the drawing). For example, the thickness t1, the thickness t2, and the thickness t3 become larger gradually within a range of 0.01 to 10 µm.

In addition, as shown in FIG. 19, when the yoke layer 135 is seen with respect to the front portion 135aA, 135bA, and 135cA, the width W1 of the front portion 135aA of the first layer 135a located at the highest (in the Z1 direction in the drawing) is the smallest, the width W2 of the front portion 135bA of the second layer 135b which is located at the intermediate and which is formed beneath the first layer 135a is larger than the width W1 of the front portion 135aA of the first layer 135a, and the width W3 of the front portion 135cA of the third layer 135c located at the lowest (in the Z2 direction in the drawing) is larger than the width W1 of the front portion 135aA of the first layer 135a and the width W2 of the front portion 135bA of the second layer 135b. That is, when the yoke layer 135 is seen with respect to the front portion 135aA, 135bA, and 135cA, as going from the top surface 135a2 of the first layer 135a to the bottom surface 135c3 of the third layer 135c (as going in the Z2 direction which is a downward direction), the width becomes larger from W1 to W2 and W3 gradually.

In the perpendicular magnetic recording head H5 of the invention, the main magnetic pole layer 24 is formed of materials having high saturation magnetic flux density. However, since the material having high saturation magnetic flux density has low permeability in general, it is difficult to induce the recording magnetic field induced in the main magnetic pole layer 24 onto the front end surface 24a of the main magnetic pole layer. For this reason, the yoke layer 135 made of materials having high permeability is adjacently formed to the main magnetic pole layer 24 so as to induce the recording magnetic field onto the front end surface 24a of the main magnetic pole layer 24 easily.

Here, in order to induce the recording magnetic field onto the front end surface 24a of the main magnetic pole layer 24 effectively, it is effective to make the yoke layer 135 approach the medium-opposing surface Ha of the recording medium. However, if the yoke layer 135 approaches the opposing surface Ha of the recording medium too much, it is easy for the recording magnetic field to flow to the recording medium M from the yoke layer 135 as well, so that a so-called side fringing occurs.

In the perpendicular magnetic recording head H5 of the invention, all of the width W4 and the thickness of the front end surface 135a1 of the first layer 135a that is the front end of the yoke layer 135 are constructed to become larger gradually as going in the height direction (in the Y2 direction in the drawing). That is, as the yoke layer 135 goes toward the medium-opposing surface Ha of the recording medium, the width and thickness become smaller. As a result, the magnetic volume of the yoke layer 135 can become smaller gradually as going toward the medium-opposing surface Ha of the recording medium. Therefore, even though the yoke layer 135 approaches the medium-opposing surface Ha of the recording medium in order to induce the recording magnetic field in the main magnetic pole layer 24 effectively, the recording magnetic field cannot easily flow to the recording medium M from the yoke layer 135, so that the side fringing can be suppressed.

Since the width and thickness of the yoke layer 135 become larger as going in the height direction (in the Y2 direction in the drawing), the farther it goes from the medium-opposing surface Ha of the recording medium, the larger the magnetic volume becomes. Therefore, since it is possible to enlarge the magnetic volume of the yoke layer 135 as a whole, the recording magnetic field can be easily induced in the main magnetic pole layer 24.

In the yoke layer 135, the width W4 becomes larger as going from the top surface 135a2 of the first layer 135a constituting the top to the bottom surface 135c3 of the third layer 135c which constitutes the bottom, that is, the width W4 becomes larger as going farther from the main magnetic pole layer 24. Therefore, since it is possible to enlarge the magnetic volume of the yoke layer 135 as a whole, the recording magnetic field can be effectively induced in the main magnetic pole layer 24 easily.

As described above, in the perpendicular magnetic recording head H5 of the invention, even though the yoke layer 135 approaches the medium-opposing surface Ha of the recording medium in order to induce the recording magnetic field in the main magnetic pole layer 24 effectively, the magnetic volume of the yoke layer 135 can become smaller as going toward the medium-opposing surface Ha of the recording medium. Therefore, the side fringing can be suppressed. Further, since it is possible to enlarge the magnetic volume of the yoke layer 135 as a whole, the recording magnetic field can be effectively induced in the main magnetic pole layer 24 easily.

The auxiliary magnetic pole layer 521 is formed on the main magnetic pole layer 24 with the nonmagnetic insulating layer 26 functioning as a magnetic gap layer interposed between them by plating with Fe—Co—Rh, Fe—Co, and Fe—Co—Ni.

The front end surface 521c of the auxiliary magnetic pole layer 521 is exposed to the medium-opposing surface Ha of the recording medium. In addition, more at the inner side than the opposing surface Ha, the connecting portion 521b formed in the auxiliary magnetic pole layer 521 is connected to the main magnetic pole layer 24. Thereby, a magnetic path for coupling the auxiliary magnetic pole layer 521 and the main magnetic pole layer 24 is formed.

As shown in FIG. 17, in the vicinity of the connecting layer 521b formed in the auxiliary magnetic pole layer 521, a coil insulating base layer 560 is formed. A coil layer 27 is formed of conductive materials, such as Cu, on the coil insulating base layer 560. The coil layer 27 is formed by the frame plating method, and the coil layer 27 is spirally pattern-formed to be wound by the predetermined winding number in the vicinity of the connecting portion 521b. The bottom raising layer 31 is formed of conductive materials, such as Cu, on the connecting end 27a at the winding center of the coil layer 27.

The coil layer 27 and the bottom raising layer 31 are covered with the insulating layer 321 made of organic materials, such as resist materials.

In addition, the top surface of the bottom raising layer 31 is exposed to the surface of the insulating portion 321, and connected to the lead layer 36. Recording current can be supplied to the bottom raising layer 31 and the coil layer 27 from the lead layer 36.

In addition, the auxiliary magnetic pole layer 521 and the lead layer 36 are covered with the protecting layer 13 formed of inorganic nonmagnetic insulating materials.

Here, the perpendicular magnetic recording head H5 shown in FIG. 17 is different from the perpendicular magnetic recording head H1 shown in FIGS. 1 to 3 in a relative position between the main magnetic pole layer 24 and the auxiliary magnetic pole layer 521 and a shape of the auxiliary magnetic pole layer 521.

That is, in the perpendicular magnetic recording head H5 shown in FIG. 17, the auxiliary magnetic layer 521 is formed on the main magnetic pole layer 24 with the nonmagnetic insulating layer 26 functioning as a magnetic gap layer interposed between them. That is, in the perpendicular magnetic recording head H5 shown in FIG. 17, the auxiliary magnetic layer 521 is located at the trailing side (the Z1 direction in the drawing), and the main magnetic pole layer 24 is formed to be located at the leading side (the Z2 direction in the drawing). Theses show the different structure from the perpendicular magnetic recording head H1 shown in FIGS. 1 to 3. Also, in the front end of the auxiliary magnetic pole layer 521, the perpendicular magnetic recording head H5 is different from the perpendicular magnetic recording head H1 shown in FIGS. 1 to 3 in that a front end portion 521a which extends toward the main magnetic pole layer 24 is formed.

The perpendicular magnetic recording head H5 constructed as above is a perpendicular magnetic recording head having the structure called a so-called shielded pole type.

As shown in FIG. 17, in the perpendicular magnetic recording head H5, the yoke layer 135 having the same structure as that of the perpendicular magnetic recording head H1 shown in FIGS. 1 to 3 is formed.

As described above, in the perpendicular magnetic recording head H1 shown in FIGS. 1 to 3, in the yoke layer 135, all of the width W4 and the thickness of the front end surface 135a1 of the first layer 135a that becomes the front end of the yoke layer 135 are constructed to become larger gradually as going in the height direction (in the Y2 direction in the drawing). That is, as the yoke layer 135 goes toward the medium-opposing surface Ha of the recording medium, the width W4 and the thickness become smaller. Thus, the magnetic volume of the yoke layer 135 can become smaller gradually as going toward the medium-opposing surface Ha of the recording medium.

Therefore, even in the perpendicular magnetic recording head H5 shown in FIG. 17, the recording magnetic field cannot easily flow to the recording medium M from the yoke layer 135, thus the side fringing can be suppressed.

Since the width W4 and the thickness of the yoke layer 135 become larger as going in the height direction (in the Y2 direction in the drawing), the farther it goes from the medium-opposing surface Ha of the recording medium, the larger the magnetic volume becomes. Therefore, since it is possible to enlarge the magnetic volume of the yoke layer 135 as a whole, the recording magnetic field can be easily induced in the main magnetic pole layer 24.

Moreover, in the yoke layer 135, the width W4 becomes larger as going from the top surface 135a2 of the first layer 135a constituting the top to the bottom surface 135c3 of the third layer 135c constituting the bottom, that is, the width W4 becomes larger as going farther from the main magnetic pole layer 24. Therefore, since it is possible to enlarge the magnetic volume of the yoke layer 135 as a whole, the recording magnetic field can be effectively induced in the main magnetic pole layer 24 easily.

In this way, in the perpendicular magnetic recording head H5 of the invention, since the magnetic volume of the yoke layer 135 can become smaller as going toward the medium-opposing surface Ha of the recording medium, the side fringing can be suppressed. Further, since it is possible to enlarge the magnetic volume of the yoke layer 135 as a whole, the recording magnetic field can be effectively induced in the main magnetic pole layer 24 easily.

In addition, in the perpendicular magnetic recording head H5 shown in FIG. 17, the main magnetic pole layer 24 is constructed to be located at the leading side (the Z2 direction in the drawing) with respect to the auxiliary magnetic pole layer 521. Therefore, in the perpendicular magnetic recording head H5 shown in FIG. 17, the auxiliary magnetic pole layer 521 can be located at the trailing side of the main magnetic pole layer 24, which enables the recording magnetic fields from the main magnetic pole layer 24 to concentrate on the trailing side.

Figure 20:
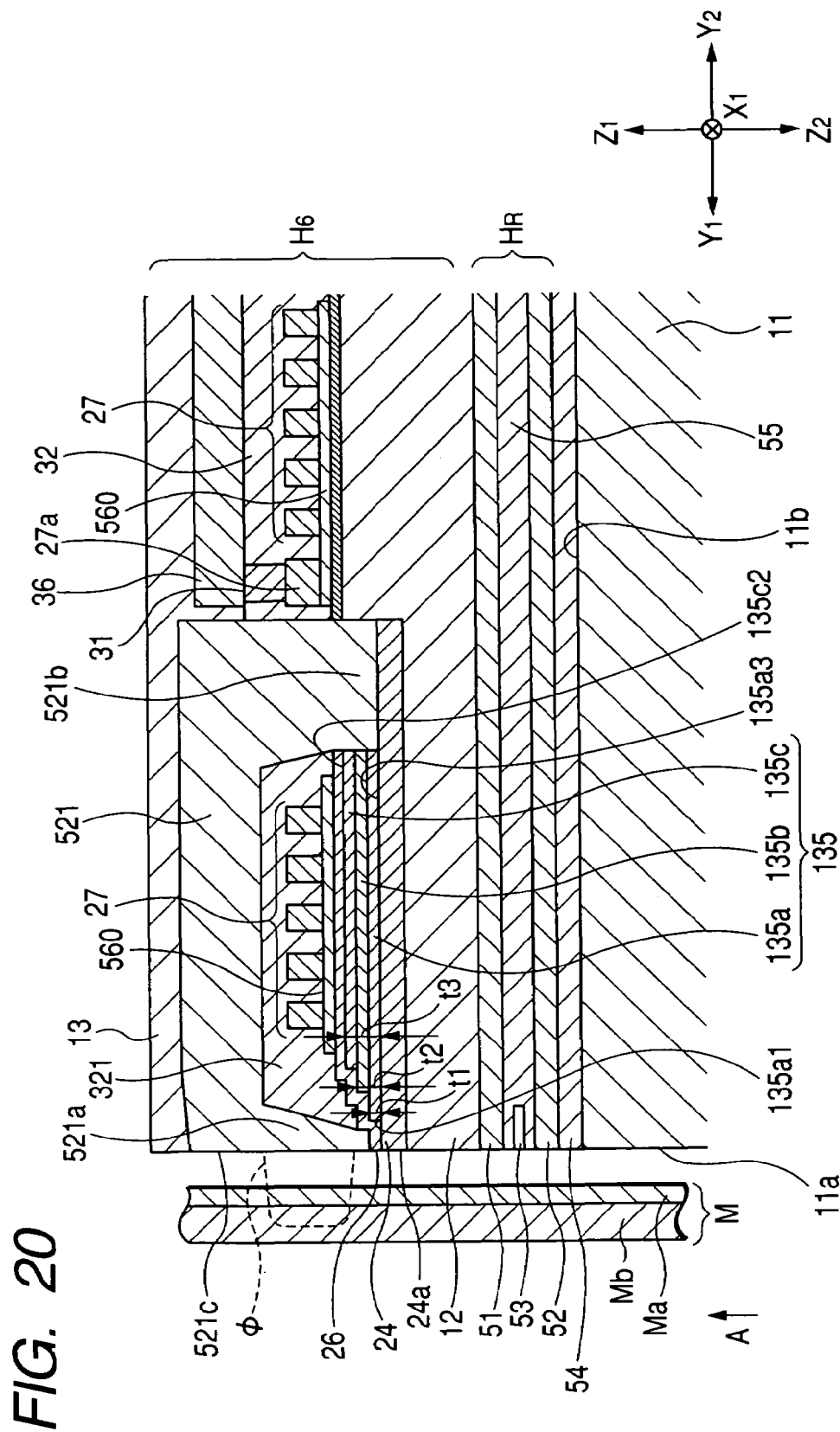
FIG. 20 is a longitudinal cross-sectional view showing a perpendicular magnetic recording head according to a sixth embodiment of the invention.
Figure 21:
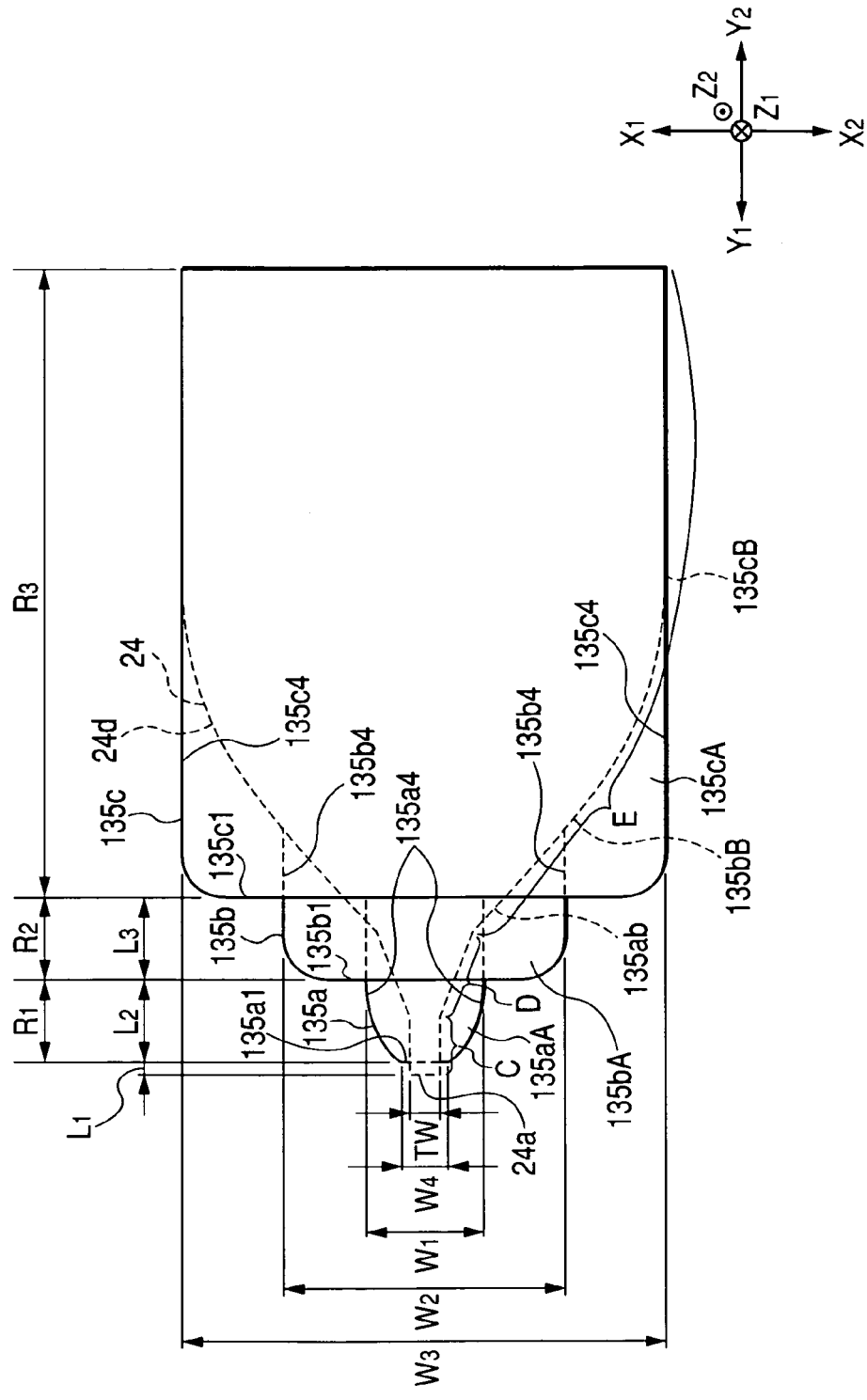
FIG. 21 is a plan view of the perpendicular magnetic recording head shown in FIG. 20 as viewed from an upper side.
Figure 22:
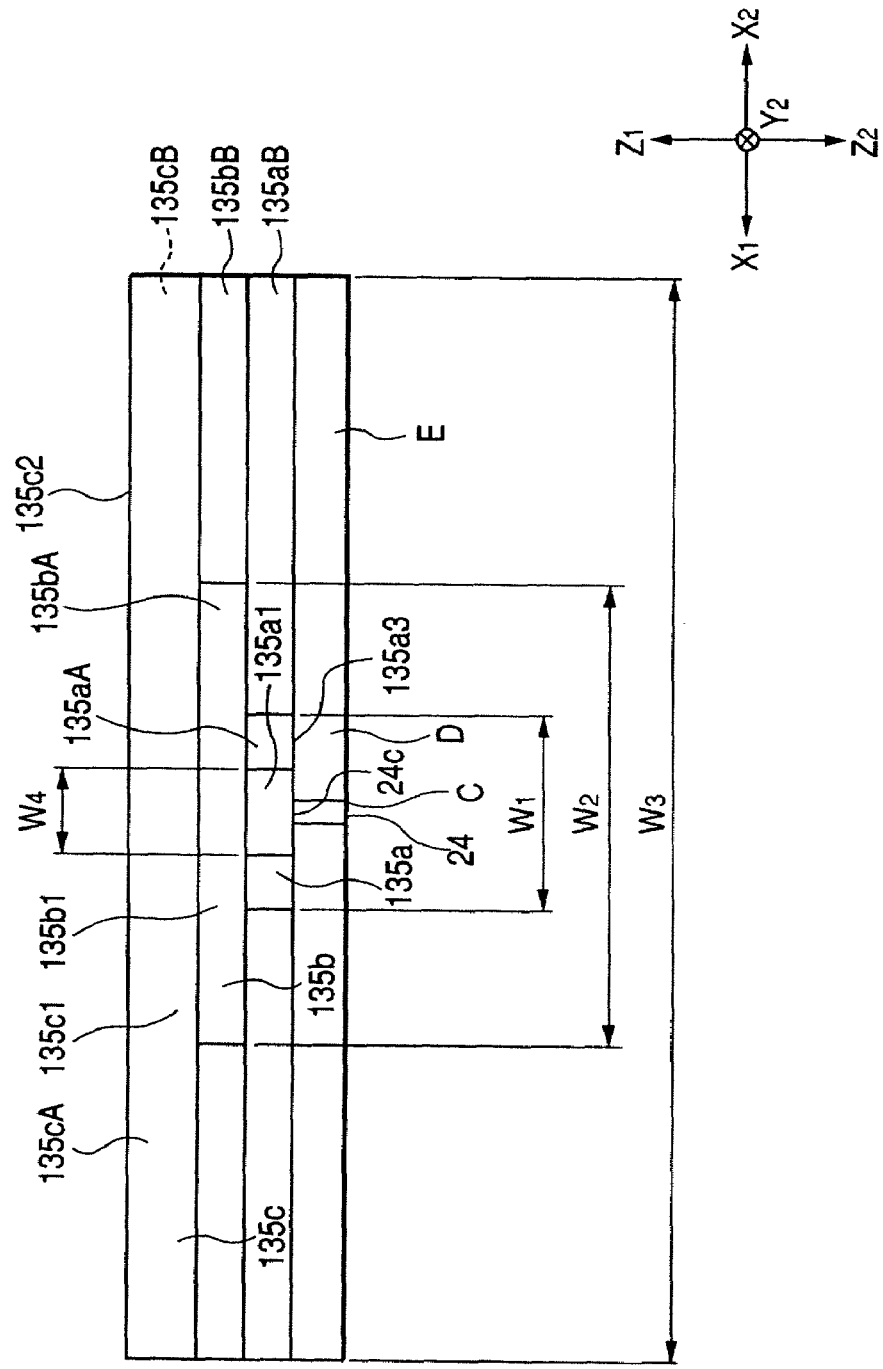
FIG. 22 is a fragmentary front view of the perpendicular magnetic recording head shown in FIG. 20 as viewed from a medium-opposing surface of a recording medium.

FIG. 20 is a longitudinal cross-sectional view showing the structure of a perpendicular magnetic recording head H6 according to a sixth embodiment of the invention, FIG. 21 is a plan view of the perpendicular magnetic recording head shown in FIG. 20 as viewed from an upper side (the Z1 direction shown in FIG. 20), and FIG. 22 is a fragmentary front view showing the main magnetic pole layer 24 and the yoke layer 135 of the perpendicular magnetic recording head H6 shown in FIG. 20 as viewed from the medium-opposing surface Ha (the Y1 side shown in FIG. 20) of the recording medium.

The perpendicular magnetic recording head H6 shown in FIGS. 20 to 22 includes the same components as those of the perpendicular magnetic recording head H5 shown in FIGS. 17 to 19. Therefore, the same components of the perpendicular magnetic recording head H6 as those of the perpendicular magnetic recording head H5 are denoted by the same reference numerals, and the detailed description thereof will be omitted.

The perpendicular magnetic recording head H6 shown in FIGS. 20 to 22 is different from the perpendicular magnetic recording head H5 shown in FIGS. 17 to 19 in a location where the yoke layer 135 is formed. As shown in FIGS. 20 to 22, the yoke layer 135 is formed on the main magnetic pole layer 24 (the trailing side). In the perpendicular magnetic recording head H6, the yoke layer 135 is a laminated structure in which, from the bottom, a first layer 135a, a second layer 135b, and a third layer 135c are laminated. Therefore, in the perpendicular magnetic recording head H6, the top surface 135c2 of the third layer 135c becomes the top surface of the yoke layer 135, and the bottom surface 135a3 of the first layer 135a becomes the bottom surface of the yoke layer 135.

As shown in FIGS. 21 and 22, the bottom surface 135a3 of the first layer 135a constituting the yoke layer 135 is formed adjacently to the top surface 24c of the main magnetic pole layer 24. The second layer 135b is formed on the first layer 135a in contact with it. The front end surface 135b1 of the second layer 135b is formed a predetermined distance L2 away from the front end surface 135a1 of the first layer 135a. In addition, the front end surface 135c1 of the third layer 135c is formed a predetermined distance L3 away from the front end surface 135b1 of the second layer 135b. Therefore, as shown in FIGS. 21 and 22, the front end surface 135a1 of the first layer 135a is constructed as the front end surface of the yoke layer 135. Further, when the yoke layer 135 is seen from the height direction (from the Y2 direction in the drawing), the yoke layer 135 includes an area R1 where only the first layer 135a is formed, an area R2 where two layers of the first layer 135a and the second layer 135b are formed, and an area R3 where three layers of the first layer 135a, the second layer 135b, and the third layer 135c are formed. For example, the distance L2 is 0.1 to 10 μm, and the distance L3 is 0.1 to 10 μm.

As shown in FIG. 21, the front end surface 135a1 of the first layer 135a is formed at a location farther by the predetermined distance L1 than the front end surface 24a of the main magnetic pole layer 24 in the height direction (in the Y2 direction in FIG. 1). The side of the medium-opposing surface Ha of the recording medium rather than the front end surface 135a1 of the first layer 135a (in the Y1 direction in the drawing, a direction opposite to the height direction) is buried in the insulating layer 321, the front end surface 135a1 of the first layer 135a which constructs the front end of the yoke layer 135 is not shown at the medium-opposing surface Ha of the recording medium. In the yoke layer 135, the yoke layer 135 is recessed by the distance L1 from the front end surface 24a of the main magnetic pole layer 24 (the medium-opposing surface Ha of the recording medium) to the front end surface 135a1 of the first layer 135a. For example, the distance L1 is 0 to 10 μm.

As shown in FIGS. 21 and 22, the maximum width W1 of the front portion 135aA of the first layer 135a is smaller than the maximum width W2 of the front portion 135bA of the second layer 135b. In addition, the maximum width W2 of the front portion 135bA of the second layer 135b is smaller than the maximum width W3 of the front portion 135cA of the third layer 135c. Therefore, when the yoke layer 135 is seen with respect to the front portion 135aA, 135bA, and 135cA, as going in the height direction (in the Y2 direction in the drawing), the width becomes larger from W1 to W2 and W3 gradually. For example, the relationships between the widths W1, W2, and W3 are 0.01 μm≦W1≦W2≦W3≦100 μm.

As shown in FIG. 21, the width W4 in a direction (the X1-X2 direction) which is orthogonal to the height direction (the Y1-Y2 direction) of the front end surface 135a1 of the first layer 135a that is the front end of the yoke layer 135, as going in the height direction (in the Y2 direction), increases to the width W1 and increases from the width W2 to the width W3.

As shown in FIGS. 20 and 21, the yoke layer 135 is constructed to have the same thickness t1 as the thickness of the first layer 135a in the area R1. In the area R2, the yoke layer 135 is constructed to have the thickness t2 which is a sum of the thickness of the first layer 135a and the thickness of the second layer 135b. In the area R3, the yoke layer 135 is constructed to have the thickness t3 which is a sum of the thickness of the first layer 135a, the thickness of the second layer 135b, and the thickness of the third layer 135c. That is, the yoke layer 135 is constructed such that its thickness becomes larger from t1 to t2 and t3 as going in the height direction (in the Y2 direction in the drawing). For example, the thickness t1, the thickness t2, and the thickness t3 becomes larger gradually within 0.01 to 10 μm.

In addition, as shown in FIG. 22, when the yoke layer 135 is seen with respect to the front portion 135aA, 135bA, and 135cA, the maximum width W1 of the front portion 135aA of the first layer 135a located at the lowest (in the Z2 direction in the drawing) is the smallest, the maximum width W2 of the front portion 135bA of the second layer 135b which is located at the intermediate and which is formed on the first layer 135a is larger than the maximum width W1 of the front portion 135aA of the first layer 135a, and the maximum width W3 of the front portion 135cA of the third layer 135c located at the highest (in the Z1 direction in the drawing) is larger than the maximum width W1 of the front portion 135aA of the first layer 135a and the maximum width W2 of the front portion 135bA of the second layer 135b. That is, when the yoke layer 135 is seen with respect to the front portion 135aA, 135bA, and 135cA, as going from the bottom surface 135a3 of the first layer 135a serving as the bottom surface to the top surface 135c2 of the third layer 135c which serving as the top surface (as going in the Z1 direction which is an upward direction), the width becomes larger from W1 to W2 and W3 gradually.

As well in the perpendicular magnetic recording head H6 shown in FIGS. 20 to 22, all of the width W4 and the thickness of the front end surface 135a1 of the first layer 135a that is the front end of the yoke layer 135 are constructed to become larger gradually as going in the height direction (in the Y2 direction in the drawing). That is, as the yoke layer 135 goes toward the medium-opposing surface Ha of the recording medium, the width and the thickness become smaller. Thus, the magnetic volume of the yoke layer 135 can become smaller gradually as going toward the medium-opposing surface Ha of the recording medium. Therefore, even though the yoke layer 135 approaches the medium-opposing surface Ha of the recording medium in order to induce the recording magnetic field in the main magnetic pole layer 24 effectively, the recording magnetic field cannot easily flow to the recording medium M from the yoke layer 135, thus the side fringing can be suppressed.

In addition, since the width and the thickness of the yoke layer 135 become larger as going in the height direction (in the Y2 direction in the drawing), the farther it goes from the medium-opposing surface Ha of the recording medium, the larger the magnetic volume becomes. Therefore, since it is possible to enlarge the magnetic volume of the yoke layer 135 as a whole, the recording magnetic field can be easily induced in the main magnetic pole layer 24.

In the yoke layer 135, the width W4 becomes larger as going from the bottom surface 135a3 of the first layer 135a constituting the bottom surface to the top surface 135c2 of the third layer 135c constituting the top surface, that is, the width W4 becomes larger as going farther from the main magnetic pole layer 24. Therefore, since it is possible to enlarge the magnetic volume of the yoke layer 135 as a whole, the recording magnetic field can be effectively induced in the main magnetic pole layer 24 easily.

As described above, as well in the perpendicular magnetic recording head H6 of the invention, even though the yoke layer 135 approaches the medium-opposing surface Ha of the recording medium in order to induce the recording magnetic field in the main magnetic pole layer 24 effectively, the magnetic volume of the yoke layer 135 can become smaller as going toward the medium-opposing surface Ha of the recording medium, thus the side fringing can be suppressed. Further, since it is possible to enlarge the magnetic volume of the yoke layer 135 as a whole, the recording magnetic field can be effectively induced in the main magnetic pole layer 24 easily.

As shown in FIG. 20, similar to the vertical magnetic recording head H5, the perpendicular magnetic recording head H6 has the structure called a so-called shielded pole type in which the main magnetic pole layer 24 is formed to be located at the leading side (in the Z2 direction in the drawing) with respect to the auxiliary magnetic pole layer 521 and the front end portion 521a of the auxiliary magnetic pole layer 521 approaches toward the main magnetic pole layer 24.

Therefore, in the perpendicular magnetic recording head H6 shown in FIG. 20, the main magnetic pole layer 24 is constructed to be located at the leading side (the Z2 direction in the drawing) with respect to the auxiliary magnetic pole layer 521 in the same manner as the perpendicular magnetic recording head H5. Therefore, in the perpendicular magnetic recording head H6 shown in FIG. 18, the auxiliary magnetic pole layer 521 can be located at the trailing side of the main magnetic pole layer 24, which enables the recording magnetic fields from the main magnetic pole layer 24 to concentrate on the trailing side.

In the perpendicular magnetic recording head H5 shown in FIGS. 17 to 19 and in the perpendicular magnetic recording head H6 shown in FIGS. 20 to 22, the embodiments in which the yoke layer 135 is constructed by three layers of the first layer 135a, the second layer 135b, and the third layer 135c are exemplified. However, in the perpendicular magnetic recording head H5 and the perpendicular magnetic recording head H6, the yoke layer 135 is not limited to the three-layer-structure, for example, the yoke layer 135 can be constructed by two or four layers.

In addition, preferably, the yoke layer 135 is constructed such that its saturation magnetic flux density becomes larger as approaching the main magnetic pole layer 24. For example, by changing the materials used in the first layer 135a, the second layer 135b, and the third layer 135c, the saturation magnetic flux density can become larger as approaching the main magnetic pole layer 24. If constructed in this way, since the magnetic flux can easily concentrated on the front end of the main magnetic pole layer 24, the recording density can be improved.

Figure 23:
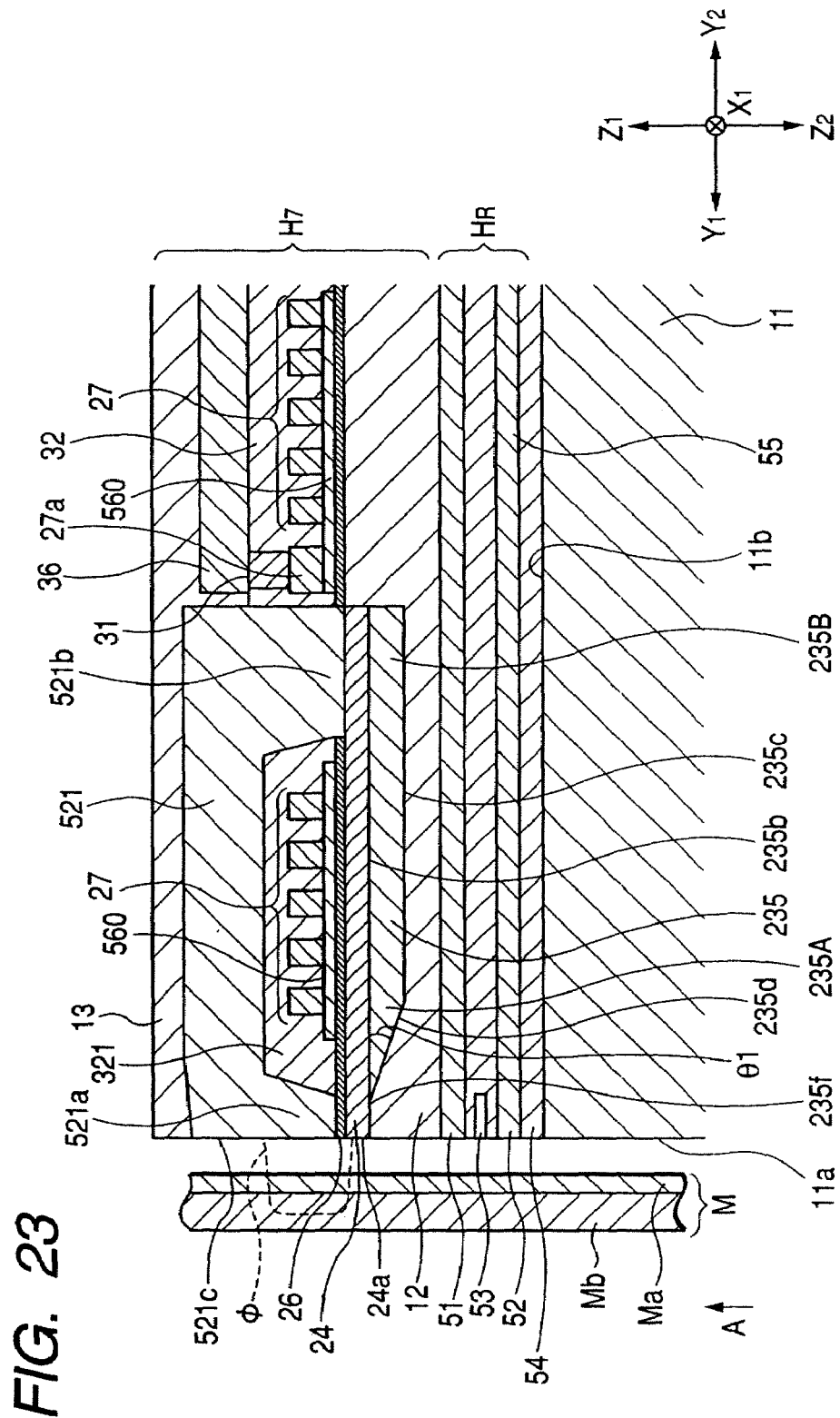
FIG. 23 is a longitudinal cross-sectional view showing a perpendicular magnetic recording head according to a seventh embodiment of the invention.
Figure 24:
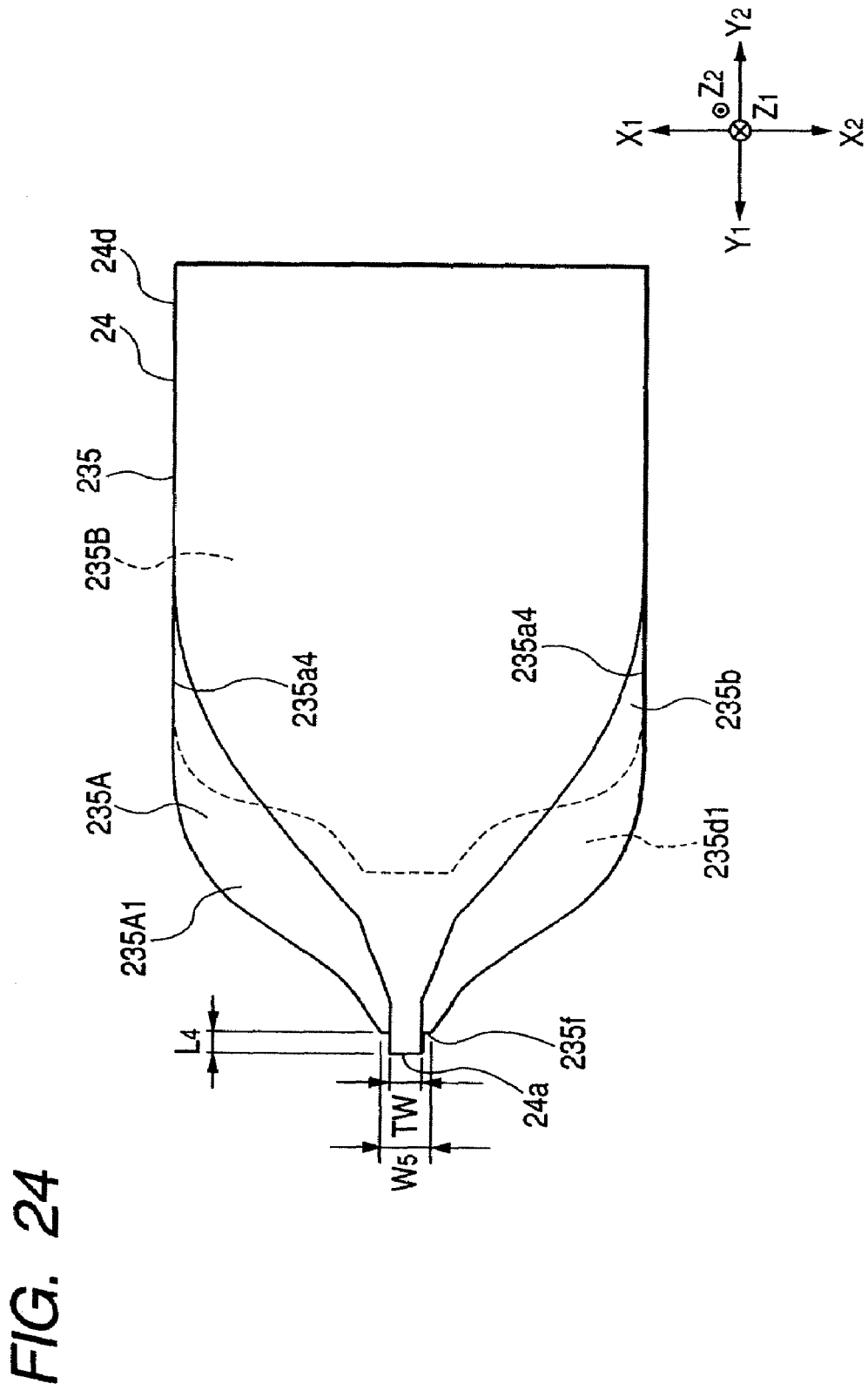
FIG. 24 is a plan view of the perpendicular magnetic recording head shown in FIG. 23 as viewed from an upper side.
Figure 25:
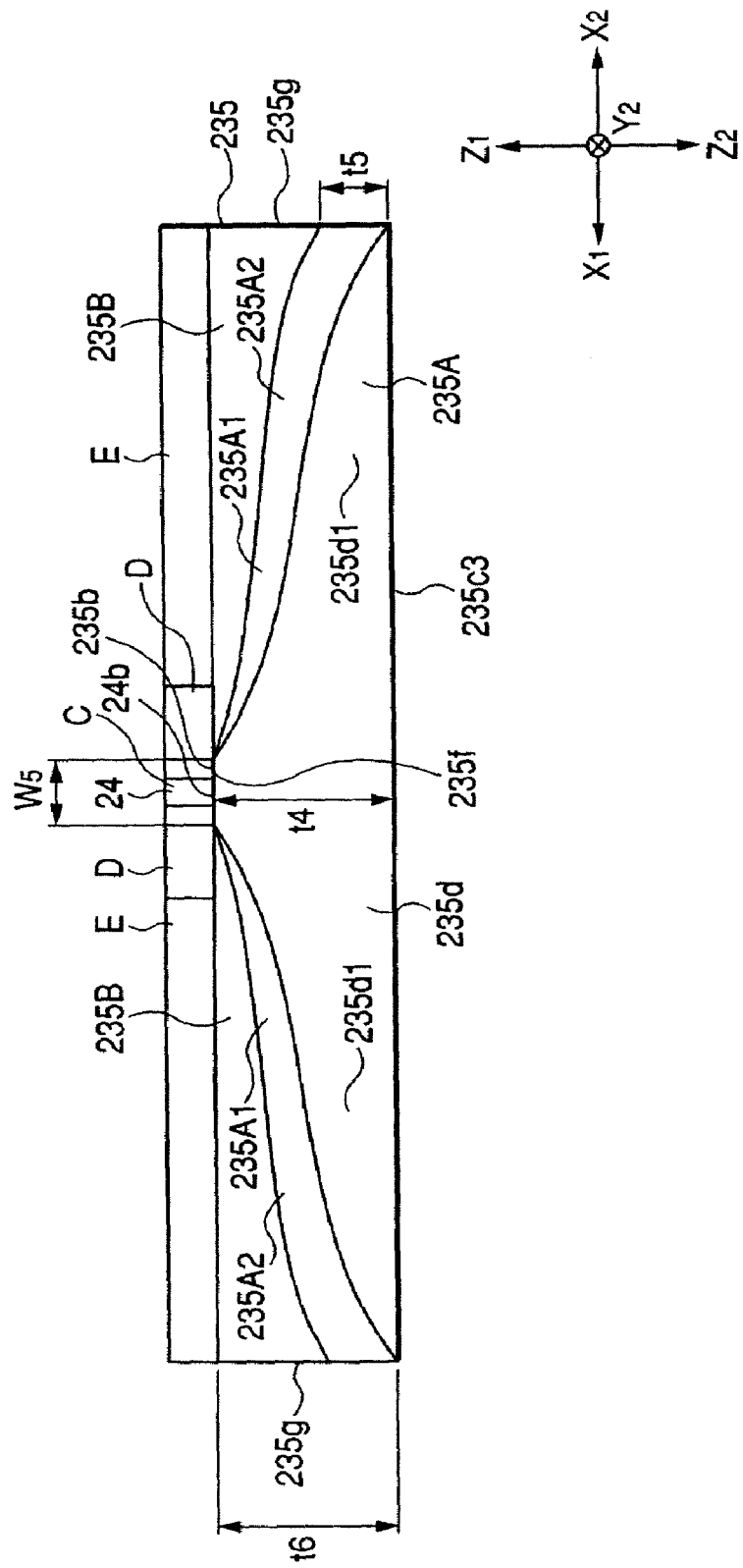
FIG. 25 is a fragmentary front view of the perpendicular magnetic recording head shown in FIG. 23 as viewed from a medium-opposing surface of a recording medium.

FIG. 23 is a longitudinal cross-sectional view showing the structure of a perpendicular magnetic recording head H7 according to a seventh embodiment of the invention, FIG. 24 is a plan view of the perpendicular magnetic recording head shown in FIG. 23 as viewed from an upper side (the Z1 direction shown in FIG. 23), and FIG. 25 is a fragmentary front view showing the main magnetic pole layer 24 and the yoke layer 235 of the perpendicular magnetic recording head H7 shown in FIG. 23 as viewed from the medium-opposing surface Ha (the Y1 side in FIG. 23) of the recording medium.

The perpendicular magnetic recording head H7 shown in FIGS. 23 to 25 includes the same components as the perpendicular magnetic recording head H3 shown in FIGS. 7 to 9 or the perpendicular magnetic recording head H5 shown in FIGS. 17 to 19. Therefore, the same components of the perpendicular magnetic recording head H7 as those of the perpendicular magnetic recording head H3 and the perpendicular magnetic recording head H5 are denoted by the same reference numerals, and the detailed description thereof will be omitted.

As shown in FIGS. 23 to 25, in the perpendicular magnetic recording head H7, the integrated yoke layer 235 shown in FIGS. 7 to 9 is formed in place of the yoke layer 135 of the perpendicular magnetic recording head H5 shown in FIGS. 17 to 19.

As shown in FIGS. 23 and 24, the yoke layer 235 is buried in the insulating layer 12, the insulating layer 12 is shown from the medium-opposing surface Ha of the recording medium, and the front end 235f of the yoke layer 235 is located in the height direction from the opposing surface Ha.

As shown in FIG. 24, the front end 235f of the yoke layer 235 is formed at a location farther by the predetermined distance L4 than the front end surface 24a (the medium-opposing surface Ha of the recording medium) of the main magnetic pole layer 24 in the height direction (in the Y2 direction in the drawing). The yoke layer 235 is recessed by the distance L4 from the front end surface 24a of the main magnetic pole layer 24 (the medium-opposing surface Ha of the recording medium) to the front end 235f of the yoke layer 235. For example, the distance L4 is within a range of 0 to 10 μm.

As shown in FIG. 24, the yoke layer 235 has the front portion 235A whose width gradually becomes larger from the front end 235f which extends in the height direction and the rear portion 235B which extends in the height direction from the front portion 235A.

The front portion 235A of the yoke layer 235, as going in the height direction from the front end 235f, extends to a location where a side edge portion 235a4 of the yoke layer 235 opposes the main magnetic pole layer 24 in a film thickness direction (in the Z1-Z2 direction in the drawing). In addition, the rear portion 235B is constructed in the height direction from the position where the side edge portion 235a4 of the yoke layer 235 faces the main magnetic pole layer 24 in the film thickness direction. As shown in FIG. 23, the rear portion 235B is formed such that the planar shape seen from the upper side is formed along the circumference 24d of the main magnetic pole layer 24.

As shown in FIG. 24, in the yoke layer 235, the width W5 whose direction is orthogonal to the height direction of the front end 235f of the yoke layer 235 gradually becomes larger continuously in the height direction (in the Y2 direction in the drawing).

In addition, as shown in FIG. 25, in the front portion 235A of the yoke layer 235, the upper inclined surface 235A2 which descends downward (in the Z2 direction in the drawing) as approaching both side end surfaces 235g and 235g of the yoke layer 235 is formed on the top surface 235A1 of the front portion 235A. On the front end surface 235d of the front portion 235A, the lower inclined surface 235d1 which descends downward as approaching both of the side end surfaces 235g and 235g of the yoke layer 235 is formed. From both side ends of the front end 235f of the yoke layer 235, the thickness becomes gradually larger so as to have the thickness t5 at both of the side end surfaces 235g and 235g. Therefore, the width W5 whose direction is orthogonal to the height direction of the front end 235f of the yoke layer 235 becomes larger continuously, as going toward the bottom surface 235c from the top surface 235b (in the Z2 direction that is a downward direction). That is, the farther it goes from the main magnetic pole layer 24, the larger the width W5 becomes.

On the other hand, the rear portion 235B is formed so as to have a constant film thickness. It is preferable that the film thickness t6 of the rear portion 235B be equal to or larger than the film thickness t5 of the front portion 235A. When the film thickness of the rear portion 235B is set in this way, it is possible to enlarge the magnetic volume of the yoke layer 235 as a whole, so that the recording magnetic field can be easily induced in the main magnetic pole layer 24.

In addition, as shown in FIG. 23, the front end surface 235d of the yoke layer 235 is formed into an inclined surface close to the opposing surface Ha toward the top surface 235b from the bottom surface 235c. Therefore, in the front end surface 235d formed into an inclined surface, as going in the height direction (in the Y2 direction in the drawing), the film thickness continuously becomes larger. The internal angle $\theta 1$ between the bottom surface 24b of the main magnetic pole layer 24 formed on the yoke layer 235 and the front end surface 235d of the yoke layer 235 is preferably set in range of 0 to 150°. Since the front end surface 235d is formed into an inclined surface and the internal angle $\theta 1$ is set in the range, the recording magnetic field can be easily suppressed from flowing to the recording medium M from the yoke layer 235, which the side fringing can be suppressed.

In addition, the front end surface 235d may be formed into a curved surface which protrudes toward the medium-opposing surface Ha of the recording medium (in the Y1 direction in FIG. 7). Alternatively, the front end surface 235d may be formed to become a curved surface which is concaved as going in the height direction (in the Y2 direction in FIG. 7).

As shown in FIG. 23, similar to the vertical magnetic recording head H5 shown in FIG. 17, the perpendicular magnetic recording head H7 has the structure called a so-called shielded pole type constructed such that the main magnetic pole layer 24 is formed to be located at the leading side with respect to the auxiliary magnetic pole layer 521 and the front end portion 521a of the auxiliary magnetic pole layer 521 approaches toward the main magnetic pole layer 24.

In addition, since the perpendicular magnetic recording head H7 shown in FIG. 23 has the structure of the shielded pole type, the main magnetic pole layer 24 is constructed to be located at the leading side (the Z2 direction in the drawing) with respect to the auxiliary magnetic pole layer 521. Therefore, in the perpendicular magnetic recording head H7 shown in FIG. 23, the auxiliary magnetic pole layer 521 can be located at the trailing side of the main magnetic pole layer 24, which enables the recording magnetic fields from the main magnetic layer 24 to be concentrated on the trailing side.

In addition, the front end surface 235d may be formed into a curved surface which protrudes toward the medium-opposing surface Ha of the recording medium (in the Y1 direction in FIG. 23). Alternatively, the front end surface 235d may be formed into a curved surface which is concaved in the height direction (in the Y2 direction in FIG. 23).

Figure 26:
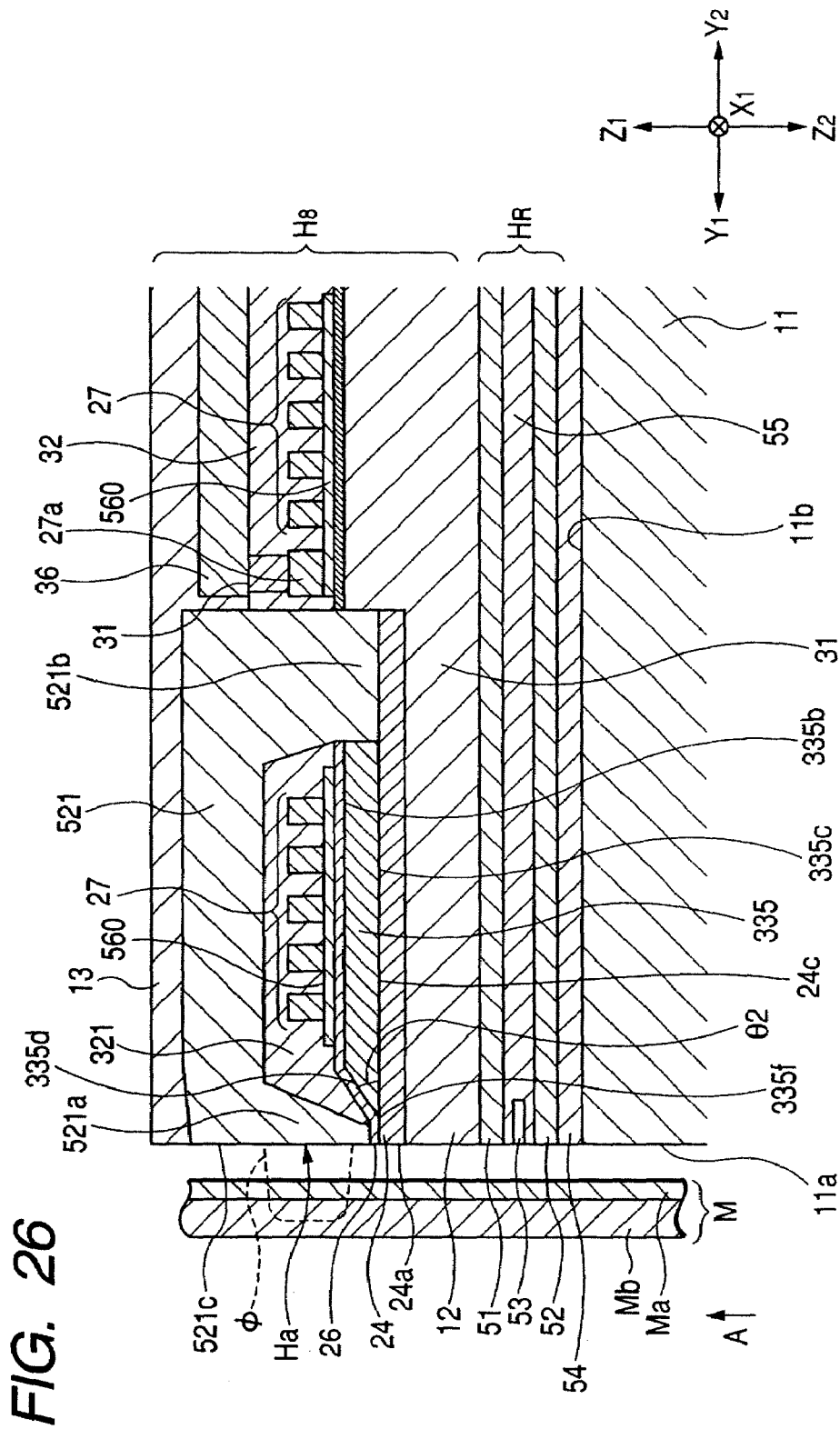
FIG. 26 is a longitudinal cross-sectional view showing a perpendicular magnetic recording head according to an eighth embodiment of the invention.
Figure 27:
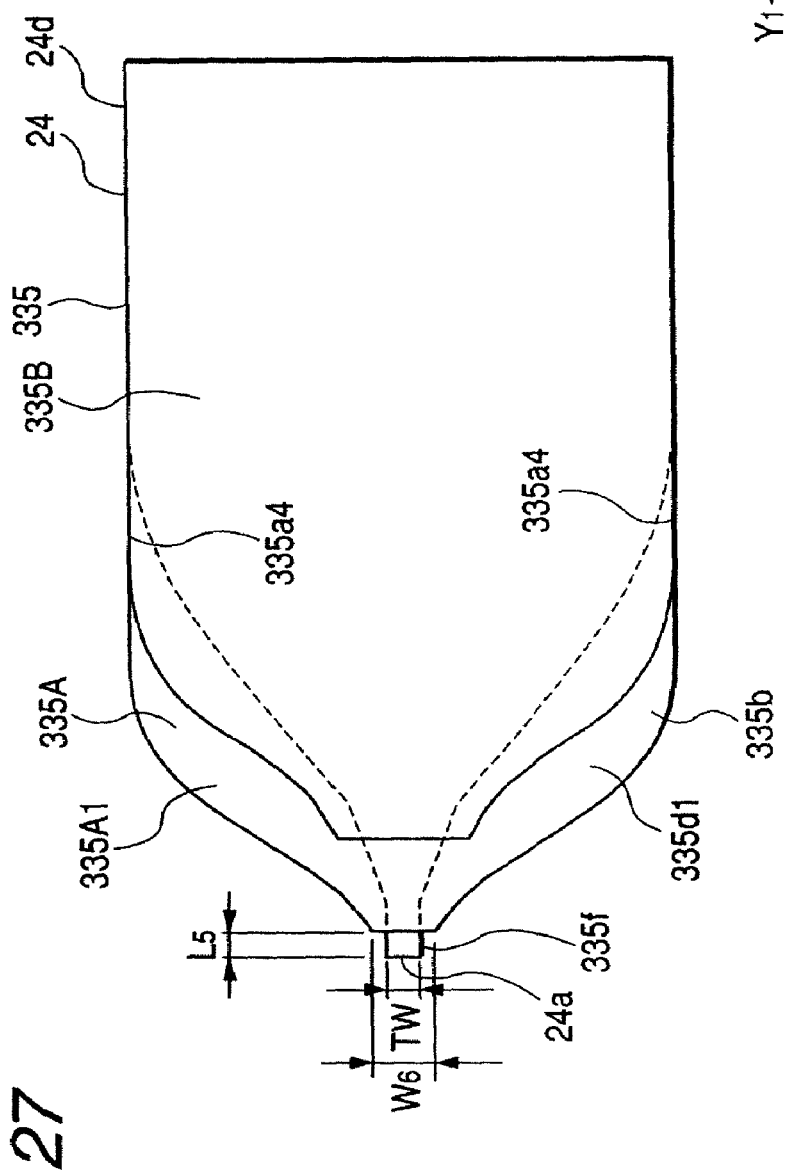
FIG. 27 is a plan view of the perpendicular magnetic recording head shown in FIG. 26 as viewed from an upper side.
Figure 28:
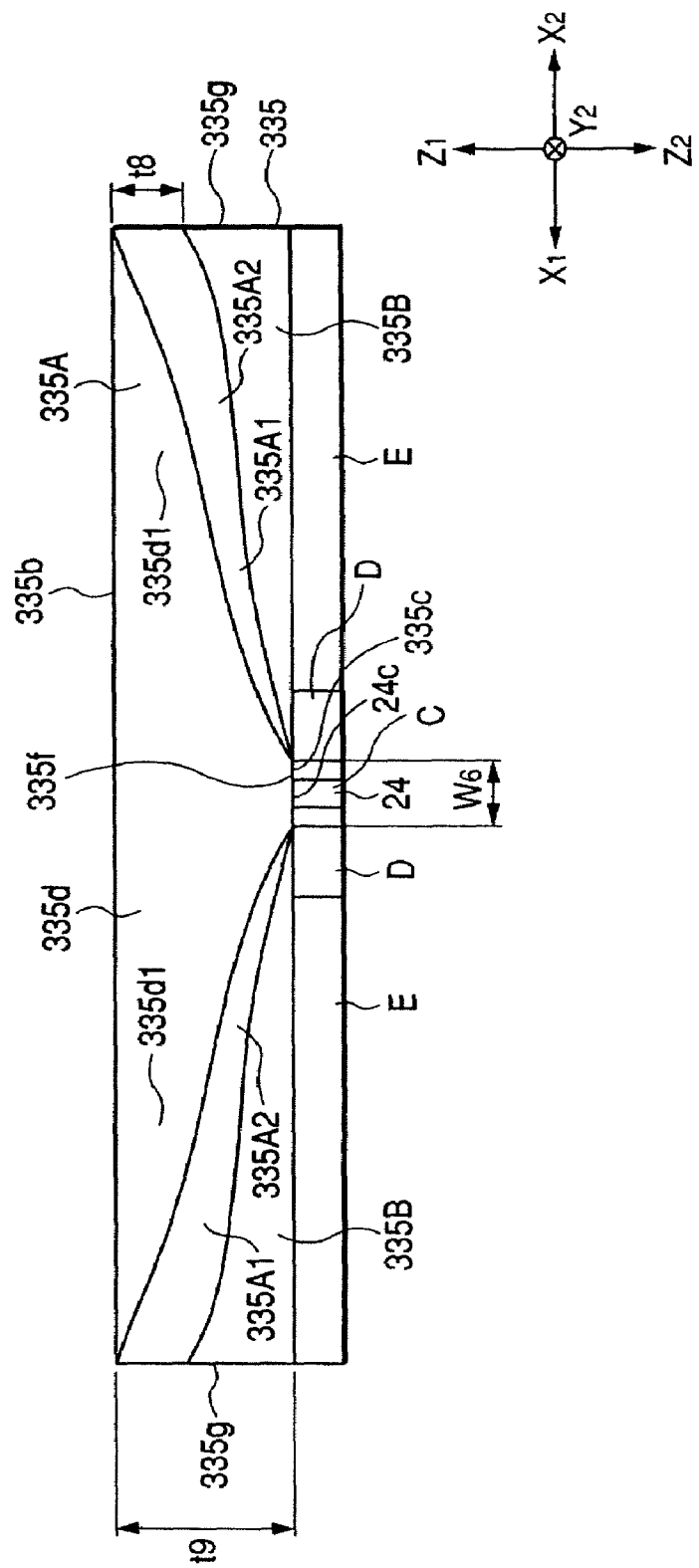
FIG. 28 is a fragmentary front view of the perpendicular magnetic recording head shown in FIG. 26 as viewed from a medium-opposing surface of a recording medium.

FIG. 26 is a longitudinal cross-sectional view showing the structure of a perpendicular magnetic recording head H8 according to an eighth embodiment of the invention, FIG. 27 is a plan view of the perpendicular magnetic recording head shown in FIG. 26 as viewed from an upper side (the Z1 direction shown in FIG. 26), and FIG. 28 is a fragmentary front view showing the main magnetic pole layer 24 and the yoke layer 335 of the perpendicular magnetic recording head H8 shown in FIG. 26 as viewed from the medium-opposing surface Ha (the Y1 side in FIG. 26) of the recording medium.

The perpendicular magnetic recording head H8 shown in FIGS. 26 to 28 includes the same components as the perpendicular magnetic recording head H4 shown in FIGS. 10 to 12 or the perpendicular magnetic recording head H6 shown in FIGS. 20 to 22. Therefore, the same components of the perpendicular magnetic recording head H8 as those of the perpendicular magnetic recording head H4 and the perpendicular magnetic recording head H6 are denoted by the same reference numerals, and the detailed description thereof will be omitted.

As shown in FIGS. 26 to 27, in the perpendicular magnetic recording head H8, the integrated yoke layer 335 shown in FIGS. 10 to 12 is formed in place of the yoke layer 135 of the perpendicular magnetic recording head H6 shown in FIGS. 20 to 22.

As shown in FIGS. 26 and 27, the yoke layer 335 is buried by the insulating layer 12, the front end 335f of the yoke layer 335 is located in the height direction from the opposing surface Ha.

As shown in FIG. 27, the front end 335f of the yoke layer 335 is formed at a location farther by the predetermined distance L5 than the front end surface 24a (the medium-opposing surface Ha of the recording medium) of the main magnetic pole layer 24 in the height direction (in the Y2 direction in the drawing). The yoke layer 335 is recessed by the distance L5 from the front end surface 24a of the main magnetic pole layer 24 (the medium-opposing surface Ha of the recording medium) to the front end 335f of the yoke layer 335. For example, the distance L5 is within a range of 0 to 10 μm.

In this way, in the perpendicular magnetic recording head H8, since the front end 335f of the yoke layer 335 is formed at a location farther by the predetermined distance L5 than the front end surface 24a of the main magnetic pole layer 24 in the height direction (in the Y2 direction in the drawing), the leakage magnetic field cannot easily flow to the recording medium M from the yoke layer 335, so that the side fringing can be effectively suppressed.

As shown in FIG. 27, the yoke layer 335 has the front portion 335A whose width gradually becomes larger from the front end 335f and which extends in the height direction and the rear portion 335B which extends in the height direction from the front portion 335A.

In addition, the front portion 335A of the yoke layer 335, as going in the height direction from the front end 335f, extends to a location where a side edge portion 335a4 of the yoke layer 335 opposes the main magnetic pole layer 24 in a film thickness direction (in the Z1-Z2 direction in the drawing). The rear portion 335B is constructed in the height direction from the position where the side edge portion 335a4 of the yoke layer 335 faces the main magnetic pole layer 24 in the film thickness direction. As shown in FIG. 27, the rear portion 335B is formed such that the planar shape seen from the upper side is formed along the circumference 24d of the main magnetic pole layer 24.

As shown in FIG. 27, in the yoke layer 335, the width W6 whose direction is orthogonal to the height direction of the front end 335f of the yoke layer 335 gradually becomes larger continuously in the height direction (in the Y2 direction in the drawing).

As shown in FIG. 28, in the front portion 335A of the yoke layer 335, the lower inclined surface 335A2 which ascends upward (in the Z1 direction) as approaching both side end surfaces 335g and 335g of the yoke layer 335 is formed on the bottom surface 335A1 of the front portion 335A. On the front end surface 335d of the front portion 335A, the upper inclined surface 335d1 which ascends upward as approaching both side end surfaces 335g and 335g of the yoke layer 335 is formed. From both side ends of the front end 335f of the yoke layer 335, the thickness becomes gradually larger so as to have the thickness t8 at both of the side end surfaces 335g and 335g. Therefore, the width W6 whose direction is orthogonal to the height direction of the front end 335f of the yoke layer 335 becomes larger continuously, as going toward the top surface 335b from the bottom surface 335c (in the Z1 direction that is an upward direction). That is, the farther it goes from the main magnetic pole layer 24, the larger the width W6 becomes.

On the other hand, the rear portion 335B is formed so as to have a constant film thickness. It is preferable that the film thickness t9 of the rear portion 335B be larger than the front end 335f. When the film thickness of the rear portion 335B is set in this way, it is possible to enlarge the magnetic volume of the yoke layer 335 as a whole, so that the recording magnetic field can be easily induced in the main magnetic pole layer 24.

In addition, as shown in FIG. 26, the front end surface 335d of the yoke layer 335 is formed into an inclined surface close to the opposing surface Ha toward the bottom surface 335c from the top surface 335b. Therefore, in the front end surface 335d formed into an inclined surface, as going in the height direction (in the Y2 direction in the drawing), the film thickness continuously becomes larger. The internal angle θ2 between the top surface 24c of the main magnetic pole layer 24 formed below the yoke layer 335 and the front end surface 335d of the yoke layer 335 is preferably set within a range of 0 to 150°. Since the front end surface 335d is formed into an inclined surface and the internal angle θ2 is set within the range, the recording magnetic field can be easily suppressed from flowing to the recording medium M from the yoke layer 335, so that the side fringing can be suppressed.

In addition, the front end surface 335d may be formed into a curved surface which protrudes toward the medium-opposing surface Ha of the recording medium (in the Y1 direction in FIG. 10). Alternatively, the front end surface 335d may be formed into a curved surface which is concaved in the height direction (in the Y2 direction in FIG. 10).

As shown in FIG. 26, similar to the vertical magnetic recording head H6 shown in FIG. 20, the perpendicular magnetic recording head H8 has the structure called a so-called shielded pole type in which the main magnetic pole layer 24 is formed to be located at the leading side with respect to the auxiliary magnetic pole layer 521 and the front end portion 521a of the auxiliary magnetic pole layer 521 approaches toward the main magnetic pole layer 24. Thus, the main magnetic pole layer 24 is constructed to be located at the leading side (in the Z2 direction in the drawing) with respect to the auxiliary magnetic pole layer 521. Therefore, in the perpendicular magnetic recording head H8 shown in FIG. 26, the auxiliary magnetic pole layer 521 can be located at the trailing side of the main magnetic pole layer 24, which enables the recording magnetic fields from the main magnetic pole layer 24 to be concentrated on the trailing side.

In addition, the front end surface 335d may be formed into a curved surface which protrudes toward the medium-opposing surface Ha of the recording medium (in the Y1 direction in FIG. 26). Alternatively, the front end surface 335d may be formed into a curved surface which is concaved in the height direction (in the Y2 direction in FIG. 26).

In addition, in the perpendicular magnetic recording head H7 shown in FIGS. 23 to 25 and in the perpendicular magnetic recording head H8 shown in FIGS. 26 to 28, in order to improve recording density, the yoke layers 235 and 335 are preferable to be constructed such that its saturation magnetic flux density becomes larger as approaching the main magnetic pole layer 24.

EXAMPLE 1

Figure 13:
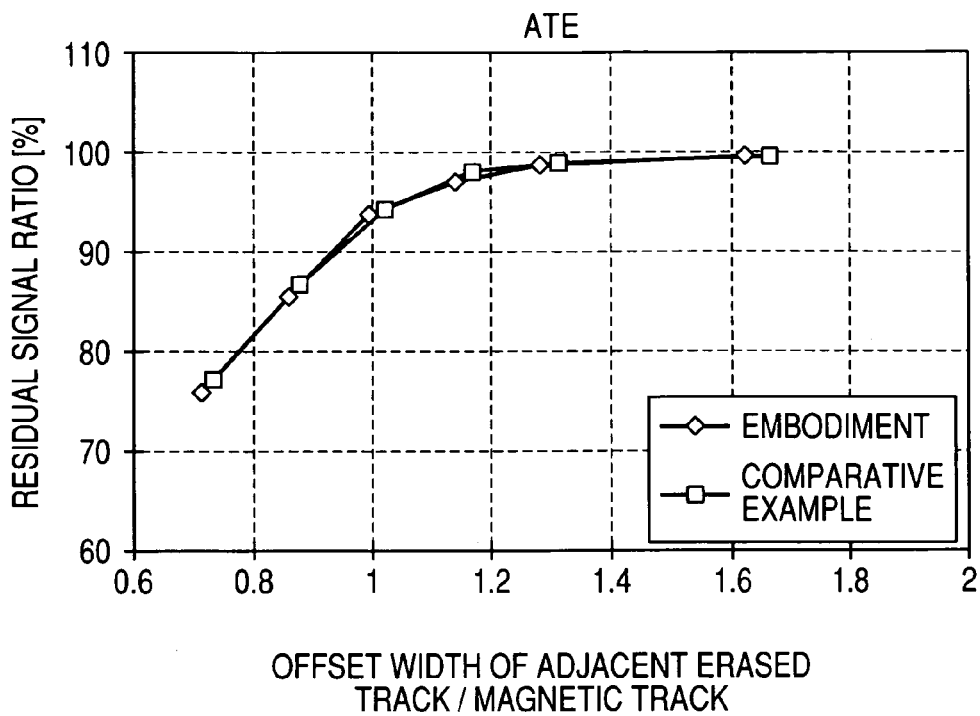
FIG. 13 is a graph comparing a residual signal ratio of the embodiment with that of a comparative example.
Figure 14:
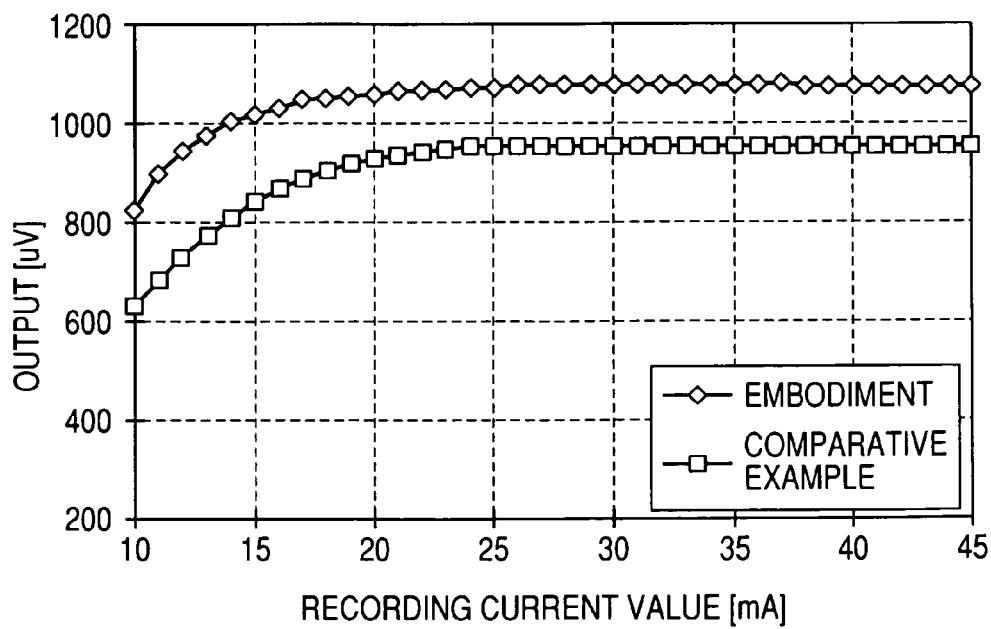
FIG. 14 is a graph comparing an output of the embodiment with that of a comparative example.
Figure 15:
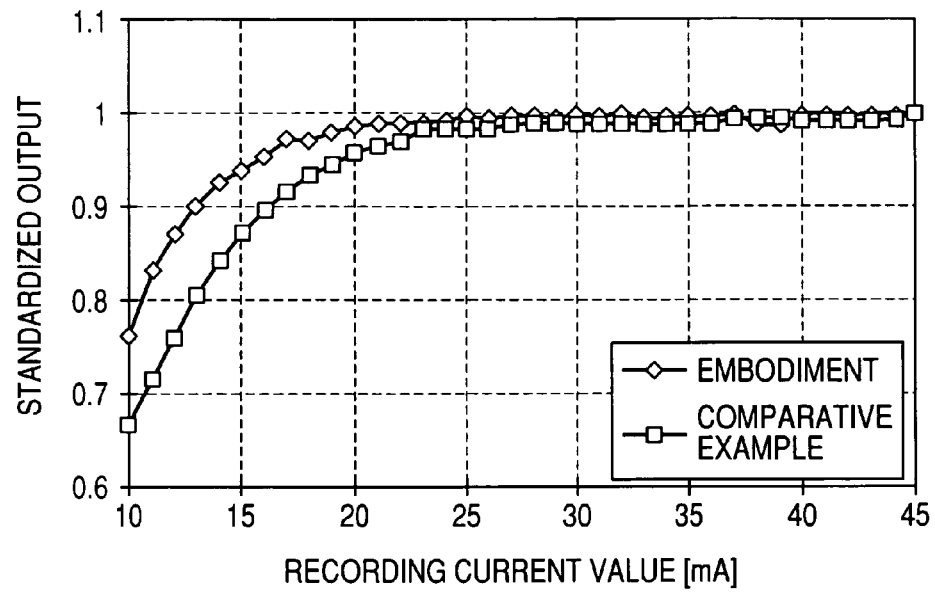
FIG. 15 is a graph shown by standardizing the output at the time of saturated magnetization as '1' in the graph shown in FIG. 14.
Figure 16:
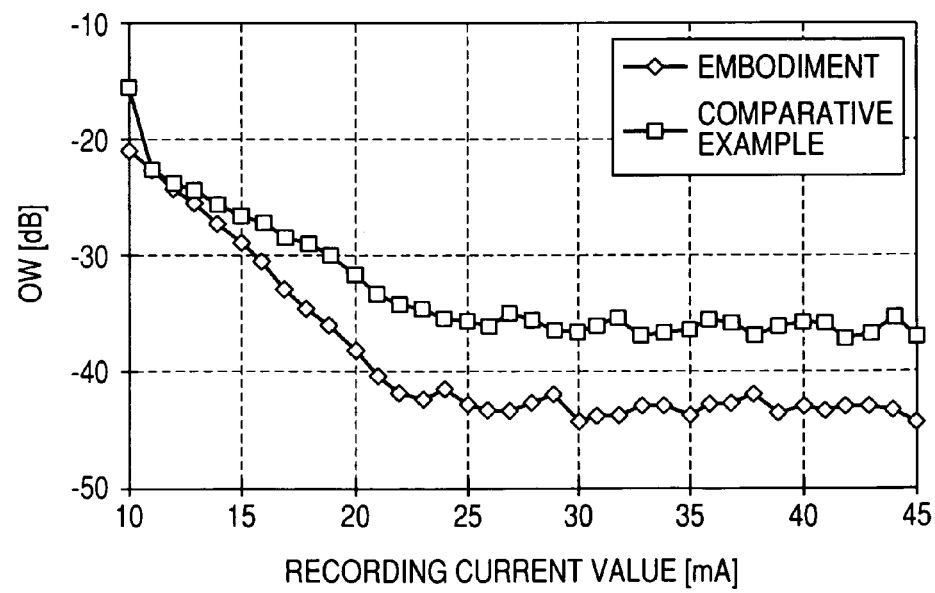
FIG. 16 is a graph showing the characteristics of overwriting in the embodiment and the comparative example.

FIG. 13 is a graph comparing a residual signal ratio of the embodiment with that of a comparative example. FIG. 14 is a graph comparing an output of the embodiment with that of the comparative example, FIG. 15 is a graph shown by standardizing the output at the time of saturated magnetization as 1 in the graph shown in FIG. 14. FIG. 16 is a graph showing the characteristics of overwriting in the embodiment and the comparative example. 'OW(dB)' of the longitudinal axis shown in FIG. 16 indicates 'OW=20×log (signal intensity after overwriting/signal intensity before overwriting)'

Here, in the embodiment, the yoke layer composed of the first and second layers is formed below (in the Z2 direction in the drawing) the main magnetic pole layer 24 of the perpendicular magnetic recording head H5 shown in FIG. 17, and the auxiliary magnetic pole layer is formed above (in the Z1 direction in the drawing) the main magnetic pole layer 24. The front end surface of the first layer is positioned 0.2 μm behind the medium-opposing surface of the recording medium in the height direction (that is, recessed by 0.2 μm), the second layer is positioned 2 μm behind the medium-opposing surface of the recording medium (that is, recessed by 2 μm). The film thickness of the first layer is 0.1 μm and the film thickness of the second layer is 1.0 μm.

On the other hand, the comparative example is constructed such that the first layer is excluded from the embodiment and only the second layer is exclusively formed below the main magnetic pole layer. In the comparative example, the second layer is recessed by 2 μm and its film thickness is 1.0 μm.

In addition, in both the embodiment and the comparative example, the film thickness of the main magnetic pole layer is set to 0.25 μm.

The residual signal ratio (%) shown in FIG. 13 is a residual signal ratio (%) of a recording track measured when an erasing track is formed by applying an erasing magnetic field (current value of 45 mA and frequency of 65 KFCI) to the recording track side after the recording track is formed by applying the recording magnetic field (current value of 45 mA and frequency of 60 KFCI) to the recording medium. The horizontal axis indicates that a gap between the center of the recording track and the center of the erasing track is an 'Offset width of an adjacent track' and the 'Offset width of an adjacent track' is divided by the magnetic track width Tw and standardized. In addition, a coercive force (Hc) of the main magnetic layer is set to 4500 Oe, and erasing is performed 5000 times.

The output (μV) shown in FIGS. 14 and 15 is a value measured when the recording magnetic field is applied with the recording current value indicated on the horizontal axis and the frequency of 60 KFCI.

As shown in FIG. 13, even though the first layer which constructs the yoke layer in the embodiment is less recessed than the second layer which constructs the yoke layer in the comparative example, the residual signal ratio is substantially the same. Therefore, it is known that even though the recess in the embodiment is smaller than that of the comparative example, both of them have the same side fringing properties.

On the other hand, as shown in FIG. 14, when it comes to comparing the output between the embodiment and the comparative example, a higher output is gained in the embodiment. In addition, as shown in FIG. 15, the higher output is maintained easier in the embodiment than the comparative example even though the recording current value is lowered.

In addition, as shown in FIG. 16, since the absolute value on the embodiment side is greater than that of the comparative example as a whole, the overwriting characteristic is better than the comparative example.

That is, from the FIGS. 13 to 16, it is known that even though the recess of the embodiment is smaller than that of the comparative example, the side fringing properties can be controlled equally, and the output and the overwriting properties can be improved.

The invention claimed is:

1. A perpendicular magnetic recording head, comprising:
a first magnetic portion;
a second magnetic portion formed with a gap from the first magnetic portion; and
a coil layer located in the gap between the first magnetic portion and the second magnetic portion for applying a recording magnetic field to the first magnetic portion and the second magnetic portion; and
wherein the second magnetic portion includes a front end portion having a track width on a surface opposed to a recording medium and a large-width portion having a width larger than that of the front end portion,
a yoke layer is formed to overlap with a portion of the second magnetic portion close to the first magnetic portion, a width in a front end portion of the yoke layer formed to be wider than both sides in the track width direction of the second magnetic portion and increases stepwise or continuously in a height direction, and the thickness at a position of the front portion of the yoke portion overlapping with the second magnetic portion stepwise or continuously increases in the height direction, and
wherein a front end portion extending in a direction coming closer to the second magnetic portion is formed on a side of the first magnetic portion opposed to the recording medium, and the front end portion of the first magnetic portion and the yoke layer located between the first magnetic portion and the second magnetic portion are opposed to each other in the height direction.

2. The perpendicular magnetic recording head according to claim 1, wherein the perpendicular magnetic recording head performs a perpendicular magnetic recording operation on the recording medium having a hard surface having high remnant magnetization in a soft surface having high magnetic permeability.

3. The perpendicular magnetic recording head according to claim 1, wherein the yoke layer has higher magnetic permeability than the second magnetic portion.

4. The perpendicular magnetic recording head according to claim 1, wherein saturation magnetic flux density of the yoke layer becomes larger as going closer to the second magnetic portion.

5. The perpendicular magnetic recording head according to claim 1, wherein the perpendicular magnetic recording head is formed in a trailing end surface of a slider and the second magnetic portion is formed closer to the slider than the first magnetic portion.

* * * * *